United States Patent
Aggarwal et al.

(10) Patent No.: US 7,522,599 B1
(45) Date of Patent: Apr. 21, 2009

(54) LABEL SWITCHING MULTICAST TREES FOR MULTICAST VIRTUAL PRIVATE NETWORKS

(75) Inventors: Rahul Aggarwal, San Francisco, CA (US); Yakov Rekhter, New Rochelle, NY (US); Anil Lohiya, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 620 days.

(21) Appl. No.: 11/212,475

(22) Filed: Aug. 26, 2005

Related U.S. Application Data

(60) Provisional application No. 60/605,629, filed on Aug. 30, 2004.

(51) Int. Cl.
H04L 12/28 (2006.01)
H04L 12/56 (2006.01)
H04L 9/00 (2006.01)

(52) U.S. Cl. .................................. 370/390; 713/163
(58) Field of Classification Search ................ 370/390; 713/163
See application file for complete search history.

(56) References Cited

U.S. PATENT DOCUMENTS

| | | | |
|---|---|---|---|
| 5,600,642 A | 2/1997 | Pauwels et al. | |
| 6,374,303 B1 | 4/2002 | Armitage et al. | |
| 6,477,166 B1 | 11/2002 | Sanzi et al. | |
| 6,493,349 B1 * | 12/2002 | Casey | 370/409 |
| 6,501,754 B1 | 12/2002 | Ohba et al. | |
| 6,731,652 B2 | 5/2004 | Ramfelt et al. | |
| 6,751,218 B1 * | 6/2004 | Hagirahim et al. | 370/390 |
| 6,778,531 B1 | 8/2004 | Kodialam et al. | |
| 6,807,182 B1 | 10/2004 | Dolphin et al. | |
| 6,879,594 B1 | 4/2005 | Lee et al. | |
| 6,968,389 B1 | 11/2005 | Menditto et al. | |
| 7,035,226 B2 | 4/2006 | Enoki et al. | |
| 7,039,687 B1 | 5/2006 | Jamieson et al. | |
| 7,082,102 B1 | 7/2006 | Wright | |
| 7,133,928 B2 | 11/2006 | McCanne | |
| 7,269,135 B2 | 9/2007 | Frick et al. | |

(Continued)

FOREIGN PATENT DOCUMENTS

KR 2004001206 1/2004

(Continued)

OTHER PUBLICATIONS

D. Awduche et al., "RFC 3209—RSVP-TE: Extensions to RSVP for LSP Tunnels," Network Working Group, Dec. 2001, 64 pgs. http://rfc.sunsite.dk/rfc/rfc3209html.

(Continued)

Primary Examiner—Ronald Abelson
(74) Attorney, Agent, or Firm—Shumaker & Sieffert, P.A.

(57) ABSTRACT

Principles of the invention are described for providing multicast virtual private networks (MVPNs) across a public network that are capable of carrying high-bandwidth multicast traffic with increased scalability. In particular, the MVPNs may transport layer three (L3) multicast traffic, such as Internet Protocol (IP) packets, between remote sites via the public network. The principles described herein may reduce the overhead of protocol independent multicast (PIM) neighbor adjacencies and customer control information maintained for MVPNs. The principles may also reduce the state and the overhead of maintaining the state in the network by removing the need to maintain at least one dedicated multicast tree per each MVPN.

35 Claims, 10 Drawing Sheets

U.S. PATENT DOCUMENTS

| | | | |
|---|---|---|---|
| 7,281,058 B1 | 10/2007 | Shepherd et al. | |
| 7,333,491 B2 | 2/2008 | Chen et al. | |
| 7,359,328 B1 | 4/2008 | Allan | |
| 2002/0071390 A1 | 6/2002 | Reeves et al. | |
| 2002/0181477 A1 | 12/2002 | Mo et al. | |
| 2002/0191584 A1 | 12/2002 | Korus et al. | |
| 2003/0012215 A1 | 1/2003 | Novaes | |
| 2003/0021282 A1 | 1/2003 | Hospodor | |
| 2003/0031175 A1 | 2/2003 | Hayashi et al. | |
| 2003/0088696 A1 | 5/2003 | McCanne | |
| 2003/0099235 A1 | 5/2003 | Shin et al. | |
| 2003/0112748 A1 | 6/2003 | Puppa et al. | |
| 2003/0123446 A1 | 7/2003 | Muirhead et al. | |
| 2003/0177221 A1 | 9/2003 | Ould-Brahim et al. | |
| 2003/0191937 A1* | 10/2003 | Balissat et al. | 713/163 |
| 2004/0037279 A1 | 2/2004 | Zelig et al. | |
| 2004/0047342 A1 | 3/2004 | Gavish et al. | |
| 2004/0081154 A1 | 4/2004 | Kouvelas | |
| 2004/0151181 A1 | 8/2004 | Chu et al. | |
| 2004/0190517 A1* | 9/2004 | Gupta et al. | 370/392 |
| 2004/0218536 A1 | 11/2004 | Yasukawa et al. | |
| 2005/0027782 A1 | 2/2005 | Jalan et al. | |
| 2005/0097203 A1 | 5/2005 | Unbehagen et al. | |
| 2005/0108419 A1 | 5/2005 | Eubanks | |
| 2005/0111351 A1 | 5/2005 | Shen | |
| 2005/0169270 A1 | 8/2005 | Mutou et al. | |
| 2005/0262232 A1 | 11/2005 | Cuervo et al. | |
| 2005/0265308 A1 | 12/2005 | Barbir et al. | |
| 2005/0281192 A1 | 12/2005 | Nadeau et al. | |
| 2006/0013141 A1 | 1/2006 | Mutoh et al. | |
| 2006/0039364 A1 | 2/2006 | Wright | |
| 2006/0047851 A1 | 3/2006 | Voit et al. | |
| 2006/0088031 A1 | 4/2006 | Nalawade | |
| 2006/0147204 A1* | 7/2006 | Yasukawa et al. | 398/26 |
| 2006/0153067 A1 | 7/2006 | Vasseur et al. | |
| 2006/0221958 A1 | 10/2006 | Wijnands et al. | |
| 2007/0036162 A1 | 2/2007 | Tingle et al. | |
| 2008/0123654 A1* | 5/2008 | Tse-Au | 370/392 |

FOREIGN PATENT DOCUMENTS

WO    WO 2004/071032 A1    8/2004

OTHER PUBLICATIONS

RSVP-TE: Resource Reservation Protocol—Traffic Extension, Javvin Company, 2 pgs, printed Apr. 18, 2005. http://www.javvin.com/protocolRSVPTE.html.

U.S. Appl. No. 11/056,383, entitled "Fast Reroute Of Traffic Associated With A Point To Multi-Point Network Tunnel," filed Feb. 10, 2005.

U.S. Appl. No. 11/212,509, entitled "Aggregate Multicast Trees For Multicast Virtual Private Networks," filed Aug. 26, 2005.

U.S. Appl. No. 11/215,813, entitled "Point To Multi-Point Label Switched Paths With Label Distribution Protocol," filed Aug. 29, 2005.

U.S. Appl. No. 11/192,432, entitled "Transmission Of Layer Two (L2) Multicast Traffic Over Multi-Protocol Label Switching Networks," filed Jul. 28, 2005.

U.S. Appl. No. 11/212,500, entitled "Multicast Data Trees For Multicast Virtual Private Networks," filed Aug. 26, 2005.

U.S. Appl. No. 11/212,507, entitled "Reliable Exchange Of Control Information For Multicast Virtual Private Networks," filed Aug. 26, 2005.

U.S. Appl. No. 11/213,636, entitled "Transport Of Control And Data Traffic For Multicast Virtual Private Networks," filed Aug. 26, 2005.

U.S. Appl. No. 11/213,638, entitled "Shared Multicast Trees For Multicast Virtual Private Networks," filed Aug. 26, 2005.

U.S. Appl. No. 11/212,932, entitled "Multicast Trees For Virtual Private Local Area Network (LAN) Service Multicast," filed Aug. 26, 2005.

U.S. Appl. No. 11/213,637, entitled "Aggregate Multicast Trees For Virtual Private Local Area Network (LAN) Service Multicast," filed Aug. 26, 2005.

U.S. Appl. No. 11/212,490, entitled "Multicast Data Trees For virtual Private Local Area Network (LAN) Service Multicast," filed Aug. 26, 2005.

U.S. Appl. No. 11/213,639, entitled "Exchange Of Control Information For Virtual Private Local Area Network (LAN) Service Multicast," filed Aug. 26, 2005.

U.S. Appl. No. 11/213,640, entitled "Auto-Discovery Of Multicast Virtual Private Networks," filed Aug. 26, 2005.

U.S. Appl. No. 11/213,641, entitled "Inter-Autonomous System (AS) Multicast Virtual Private Networks," filed Aug. 26, 2005.

Aggarwal et al., "Establishing Point to Multipoint MPLS TE LSPs," submitted to Internet Engineering Task Force (IETF) Feb. 11, 2007, pp. 1-15.

Yasukawa et al. "Requirements for Point to Multipoint extension to RSVP-TE," IETF, Oct. 2003, pp. 1-20.

Atlas et al., "MPLS RSVP-TE Interoperability for Local Protection/Fast Reroute," IETF, Jul. 2001, pp. 1-14.

B. Zhang and H. Mouftah, "A Destination-initiated Multicast Routing Protocol for Shortest Path Tree Constructions," GLOBECOM 2003, IEEE Global Telecommunications Conference, XP010677629, pp. 2840-2844.

Eric C. Rosen et al., "Multicast in MPLS/BGP IP VPNs," draft-rosen-vpn-mcast-07.txt, May 2004, 27 pgs.

Steven Deering et al., "Protocol Independent Multicast-Sparse Mode (PIM-SM): Motivation and Architecture," draft-ietf-idmr-pim-arch-05.txt, Aug. 4, 1998, 30 pgs.

K. Kompella et al., "Virtual Private LAN Service," draft-ietf-l2vpn-vpls-bgp-00.txt, May 2003, 22 pgs.

Y. Rekhter et al., "A Border Gateway Protocol 4 (BGP-4)," May 1995, 72 pgs.

* cited by examiner

LABEL SWITCHING MULTICAST TREES FOR MULTICAST VIRTUAL PRIVATE NETWORKS

This application claims the benefit of U.S. Provisional Application No. 60/605,629, filed Aug. 30, 2004, the entire content of which is incorporated herein by reference.

CROSS-REFERENCE TO RELATED APPLICATIONS

This application is related to the following applications:

"Aggregate Multicast Trees for Multicast Virtual Private Networks," by Rahul Aggarwal and Yakov Rekhter, Ser. No. 11/212,509, filed the same day as the present application;

"Multicast Data Trees For Multicast Virtual Private Networks," by Rahul Aggarwal, Yakov Rekhter and Anil Lohiya, Ser. No. 11/212,490, filed the same day as the present application;

"Reliable Exchange Of Control Information For Multicast Virtual Private Networks," by Rahul Aggarwal, Yakov Rekhter and Anil Lohiya, Ser. No. 11/212,507, filed the same day as the present application;

"Transport of Control And Data Traffic For Multicast Virtual Private Networks," by Rahul Aggarwal, Yakov Rekhter and Anil Lohiya, Ser. No. 11/213,636, filed the same day as the present application;

"Shared Multicast Trees For Multicast Virtual Private Networks," by Rahul Aggarwal and Yakov Rekhter, Ser. No. 11/213,638, filed the same day as the present application;

"Multicast Trees for Virtual Private Local Area Network (LAN) Service Multicast," by Rahul Aggarwal and Yakov Rekhter, Ser. No. 11/212,932, filed the same day as the present application;

"Aggregate Multicast Trees For Virtual Private Local Area Network (LAN) Service Multicast," by Rahul Aggarwal and Yakov Rekhter, Ser. No. 11/213,637, filed the same day as the present application;

"Multicast Data Trees For Virtual Private Local Area Network (LAN) Service Multicast," by Rahul Aggarwal and Yakov Rekhter, Ser. No. 11/212,500, filed the same day as the present application;

"Exchange Of Control Information for Virtual Private Local Area Network (LAN) Service Multicast," by Rahul Aggarwal and Yakov Rekhter, Ser. No. 11/212,475, filed the same day as the present application;

"Auto-Discovery Of Multicast Virtual Private Networks," by Rahul Aggarwal and Yakov Rekhter, Ser. No. 11/213,640, filed the same day as the present application; and "Inter-Autonomous System (AS) Multicast Virtual Private Networks," by Rahul Aggarwal and Yakov Rekhter, Ser. No. 11/213,641, filed the same day as the present application, the entire content of each of which is incorporated herein by reference.

TECHNICAL FIELD

The invention relates to computer networks and, more particularly, to virtual private networks (VPNs) established over computer networks.

BACKGROUND

A computer network is a collection of interconnected computing devices that exchange data and share resources. In a packet-based network the computing devices communicate data by dividing the data into small blocks called packets. Certain devices within the network, such as routers, maintain routing information that describes routes through the network. In this way, the packets may be individually routed across the network from a source device to a destination device. The destination device extracts the data from the packets and assembles the data into its original form. Dividing the data into packets enables the source device to resend only those individual packets that may be lost during transmission.

Virtual private networks (VPNs) are often used to securely share data over a public network, such as the Internet. For example, an enterprise that includes multiple geographically separated sites, each site including one or more computing devices, may establish a VPN to allow the computing devices to securely communicate through the Internet or another public network. In particular, VPNs transport layer three (L3) communications, such as Internet Protocol (IP) packets, between the remote sites via the public network.

In some cases, a VPN may be configured to carry L3 multicast traffic, such as Internet Protocol Television (IPTV), desktop conferences, corporate broadcasts, music and video web casts, and other forms of multimedia content. Multicast VPNs (MVPNs) typically rely on ingress replication to transmit the multicast traffic from a multicast source to subscriber devices within the MVPN sites. Ingress replication causes an ingress router of a MVPN to replicate a multicast data packet of a particular multicast group and send it to each egress router of the MVPN on the path to a subscriber device of that multicast group. However, ingress replication may be a reasonable model only when the bandwidth of the multicast traffic is low and/or the number of replications performed by the ingress router for a particular multicast data packet is small.

In order to handle high bandwidth multicast traffic, a MVPN may utilize protocol independent multicast (PIM) to tunnel multicast packets from a multicast source to subscriber devices within the MVPN sites. However, using PIM for MVPNs introduces fundamental scalability issues when a network includes a large number of MVPNs each with a large number of subscriber sites.

For a particular MVPN, a router maintains PIM neighbor adjacencies with every other router that has a site in that MVPN. Thus for a given router-router pair, multiple PIM adjacencies may be required, one per MVPN that the routers have in common. For each such PIM neighbor adjacency, the router sends and receives PIM "hello" packets transmitted periodically. For example, on a router with 1000 MVPNs and 100 sites per MVPN the router would typically maintain 100,000 PIM neighbors. In this case, a default hello interval of 30 seconds would result in an average of 3,333 hello messages per second.

Furthermore, PIM is a soft state protocol that requires periodic transmission of customer control information, such as PIM join/prune messages. A router propagates the customer join/prune messages received from a subscriber device to other routers in the network. Each router in the network participating in one or more MVPNs periodically refreshes these PIM customer join/prune messages. This can lead to a large overhead of periodic maintenance messages. Lastly, a router may use PIM to setup a multicast tree across the network for each MVPN to which the router belongs. In this way, PIM cause the network to maintain state for each MVPN established across the network.

SUMMARY

In general, principles of the invention are described for providing multicast virtual private networks (MVPNs) across a public network that are capable of carrying high bandwidth multicast traffic with increased scalability. For example, the principles of the invention may be applied to MVPNs that transport layer three (L3) multicast traffic, such as Internet Protocol (IP) packets, between remote sites via the public network. The principles described herein may reduce the overhead of protocol independent multicast (PIM) neighbor adjacencies and customer control information maintained for MVPNs. The principles may also reduce the state and the overhead of maintaining the state in the network by removing the need to maintain at least one dedicated multicast tree per each MVPN.

For example, a router within a public network, such as the Internet, may use the border gateway protocol (BGP) to discover MVPN memberships of other routers in the public network and maintain PIM neighbor adjacencies. In addition, a router may use reliable transport, such as BGP or PIM with reliability extensions, to transmit control messages, such as customer join/prune messages, between routers while substantially eliminating the need for periodic maintenance messages. Auto-discovering the MVPN memberships with BGP enables customer control and data traffic to be transmitted separately using different tunneling technologies.

By separating the control messages and the data traffic, multicast trees may be setup across the public network by non-PIM protocols, such as multi-protocol label switching (MPLS) protocols. The MPLS protocols may include the label distribution protocol (LDP), and the resource reservation protocol (RSVP), which may be extended to include traffic engineering (TE) capabilities. The multicast trees may comprise aggregate multicast trees that support more than one MVPN to reduce the state maintained in the public network. In addition, data multicast trees may be setup to transmit traffic for specific high bandwidth multicast groups. The multicast trees may be source trees or shared trees. Furthermore, multicast trees setup across a public network, or autonomous system (AS), may be stitched to other multicast trees established in another AS to provide inter-AS MVPN service without relying on a single MVPN tunnel.

In one embodiment, a method comprises using a label switching protocol to establish a multicast tree having a source device and one or more destination devices within a network, wherein each of the one or more destination devices belongs to at least one MVPN. The method further comprises transmitting multicast data packets for the MVPNs from the source device to the one or more destination devices on the multicast tree.

In another embodiment, a network device comprises a control unit that uses a label switching protocol to establish a multicast tree having a source device and one or more destination devices within a network, wherein each of the destination devices belongs to at least one MVPN. The control unit also transmits multicast data packets for the MVPNs from the source device to the one or more destination devices on the multicast tree.

In another embodiment, a computer-readable medium comprises instructions that cause a programmable processor to use a label switching protocol to establish a multicast tree having a source device and one or more destination devices within a network, wherein each of the destination devices belongs to at least one MVPN. The instructions further cause the programmable processor to transmit multicast data packets for the MVPNs from the source device to the one or more destination devices on the multicast tree.

In a further embodiment, a system comprises a source device within a network, one or more destination devices within the network, wherein each of the destination devices belongs to at least one MVPN, and a multicast tree established within the network by a label switching protocol. The multicast tree transmits multicast data packets for the MVPNs from the source device to the one or more destination devices.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
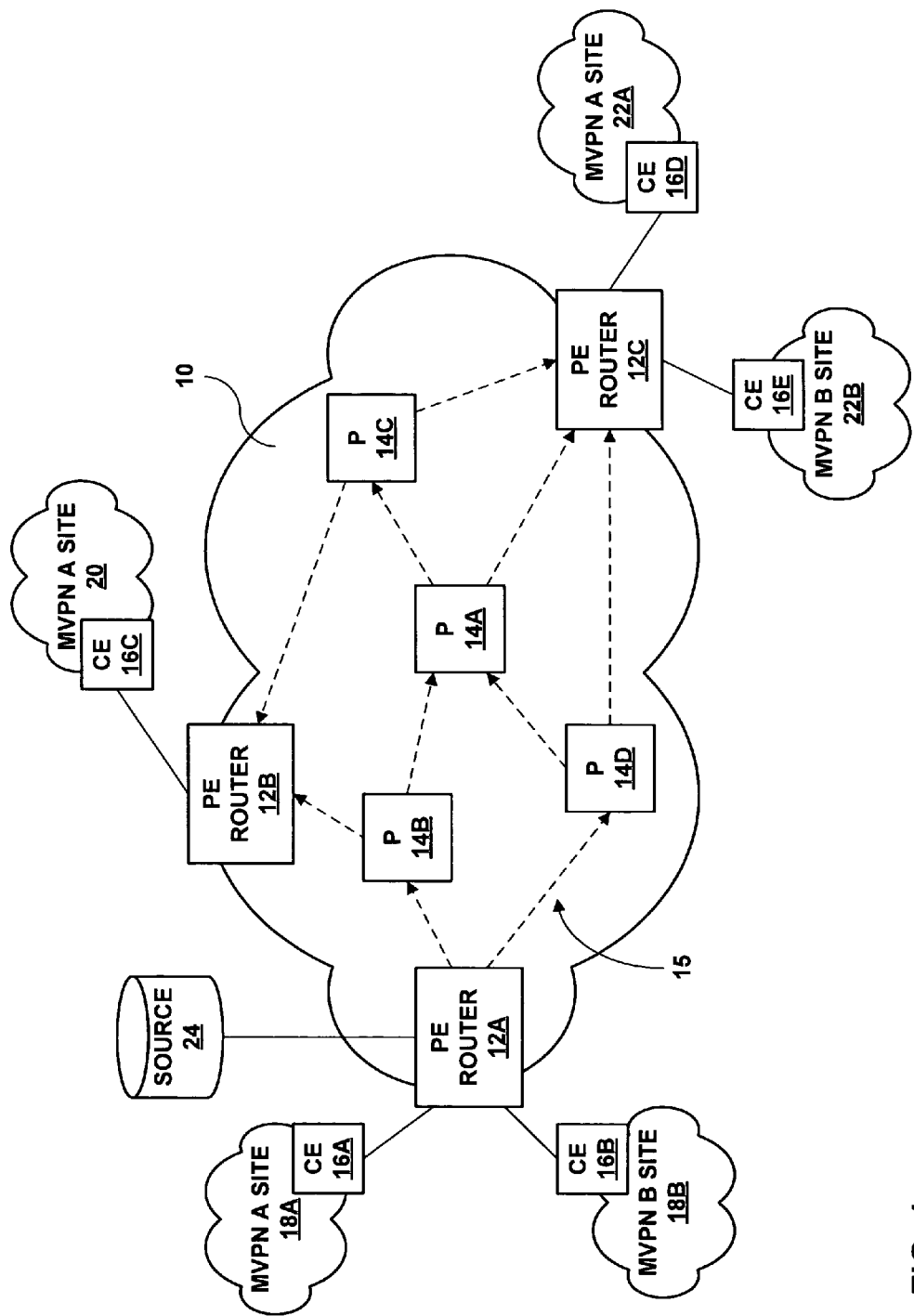
FIG. 1 is a block diagram illustrating an example service provider (SP) network in which provider edge (PE) routers support at least one multicast virtual private network (MVPN).

FIG. 1 is a block diagram illustrating an example service provider (SP) network 10 in which provider edge (PE) routers 12A-12C ("PE routers 12") support at least one multicast virtual private network (MVPN). In the illustrated embodiment, PE router 12A sets up a multicast tree 15 across the SP network 10 to provide layer three (L3) multicast service between PE routers 12. For example, multicast tree 15 may transport L3 multicast traffic from a multicast source 24 to subscriber devices within at least one of the MVPN A site and the MVPN B site coupled to PE routers 12. In other embodiments, multicast tree 15 may be setup by any one of PE routers 12.

SP network 10 may comprise the Internet or another public network. In some cases, SP network 10 may comprise a multi-protocol label switching (MPLS) network. Each of the MVPN sites may include a local area network (LAN) or a wide area network (WAN) that comprises a plurality of subscriber devices, such as desktop computers, laptops, workstations, PDAs, wireless devices, network-ready appliances, file servers, print servers or other devices.

Each of PE routers 12 couples to one or more of the MVPN sites via customer edge (CE) routers 16A-16E ("CE routers 16"). For example, PE router 12A is coupled to MVPN A site 18A and MVPN B site 18B via CE router 16A and CE router 16B, respectively. PE router 12A is also coupled to multicast source 24. PE router 12B is coupled to MVPN A site 20 via CE router 16C. PE router 13C is coupled to MVPN A site 22A and MVPN B site 22B via CE router 16D and CE router 16E, respectively. Multicast tree 15 couples PE routers 12 to each other via provider (P) routers 14A-14D ("P routers 14") within SP network 10.

In the illustrated embodiment, MVPN A and MVPN B established across SP network 10 are capable of carrying high bandwidth multicast traffic with increased scalability. For example, MVPN A and MVPN B may carry L3 multicast traffic, such as Internet Protocol Television (IPTV), desktop conferences, corporate broadcasts, music and video web casts, and other forms of multimedia content, from multicast source 24 to subscriber devices within the MVPN A sites and the MVPN B sites. Moreover, principles of the invention described herein may reduce the overhead of PIM neighbor adjacencies maintained for MVPN A and MVPN B. The invention may also reduce the state and the overhead of maintaining the state within SP network 10 by removing the need to maintain at least one dedicated multicast tree per MVPN.

In one embodiment, each of PE routers 12 includes virtual routing and forwarding (VRF) (not shown) for each MVPN to which it has membership. PE routers 12 advertise their MVPN membership, i.e., the VRFs configured for multicast, to the other PE routers 12 using the border gateway protocol (BGP). In this way, each of PE routers 12 in SP network 10 have a complete view of the MVPN memberships of the other PE routers.

A PE router that belongs to a certain MVPN considers all the other PE routers that advertise membership for that MVPN to be PIM neighbors. For example, PE router 12A belongs to MVPN A and MVPN B, PE router 12B belongs to MVPN A, and PE router 12C belongs to MVPN A and MVPN B. Therefore, PE router 12A considers PE router 12B and PE router 12C to be PIM neighbors for MVPN A. PE router 12A considers PE router 12C to be a PIM neighbor for MVPN B.

A PIM neighbor adjacency exists as long as the BGP advertisement is not withdrawn. By using BGP advertisements, PE routers 12 do not have to perform PIM neighbor adjacency management. This eliminates PIM hello processing typically required for maintaining the PIM neighbor adjacency. In some cases, the BGP advertisements may support optional capabilities conventionally exchanged between PIM neighbors by PIM hellos.

In addition, a reliable transport protocol may be used to transmit customer control messages between PE routers 12. A reliable transport protocol, such as BGP or PIM extended to include a refresh reduction mechanism, substantially eliminates the need to periodically refresh customer control messages. For example, PE router 12A may use BGP or PIM with reliability extensions to transmit customer join/prune messages received from a subscriber device within one of MVPN sites 18A and 18B to the other PE routers 12 in SP network 10.

In conventional MVPNs that only use the PIM tunneling protocol, multicast domain (MD) tunnels are established across a public network for sending both customer control messages and customer data traffic. The single tunneling protocol creates an undesirable dependency between the exchange of customer multicast control information and the multicast transport technology.

Utilizing BGP advertisements for MVPNs, as described above, makes the discovery and maintenance of PIM neighbors independent of the multicast data transport technology in SP network 10. In other words, customer control and multicast data traffic may be transmitted separately using different tunneling protocols. PE routers 12 may use PE-to-PE tunnels to exchange customer multicast control information. For example, PE router 12B may use a PE-to-PE tunnel to send customer multicast control information to the upstream PE router 12A that is a PIM neighbor.

PE router 12A may setup multicast tree 15 across SP network 10 to transport customer multicast data with one of a variety of tunneling technologies, without impacting the procedures for exchange of MVPN routing information. For example, multicast tree 15 may be setup by PE router 12A using PIM or non-PIM protocols, such as MPLS protocols. MPLS protocols include the label distribution protocol (LDP) and the resource reservation protocol (RSVP), which may be extended to include traffic engineering (TE). In the case of PE router 12A using RSVP-TE, multicast tree 15 may comprise a point-to-multipoint (P2MP) label switched path (LSP).

In the illustrated embodiment, multicast tree 15 comprises an "aggregate" multicast tree capable of transmitting traffic for both MVPN A and MVPN B across SP network 10. In this way, SP network 10 does not need to separately maintain state per each MVPN as one multicast tree 15 can be used to support multiple MVPNs. In some cases, multicast tree 15 may comprise an aggregate "default" tree mapped to MVPN A and MVPN B. In other cases, since PE router 12A is coupled to multicast source 24, multicast tree 15 may comprise an aggregate "data" tree mapped to specific multicast groups. These embodiments are described in further detail below.

In the case where multicast tree 15 comprises an aggregate default tree, multicast tree 15 carries traffic of all the multicast groups requested by subscriber devices within both MVPN A and MVPN B. PE router 12A may setup multicast tree 15 as an aggregate default tree by using BGP to discover egress PE routers 12B and 12C, i.e., the leaves of multicast tree 15. PIM neighbor discovery and maintenance using BGP allows PE router 12A to learn the MVPN membership information of PE routers 12B and 12C. This in turn allows the creation of the aggregate default tree mapped to MVPN A and MVPN B. The leaves of the aggregate default tree are the PE routers within SP network 10 that belong to one or more of the MVPNs mapped to the aggregate default tree. In other embodiments, multicast tree 15 may be setup as an aggregate default tree by any of PE routers 12 or by a rendezvous point (RP), e.g., one of P routers 14, within SP network 10.

By removing the need to separately maintain per MVPN state in SP network 10, aggregate default trees may effectively reduce the number of trees in SP network 10 and the signaling overhead associated with maintaining these trees. However, since aggregate default tree 15 carries traffic for all the multicast groups requested in both MVPN A and MVPN B, aggregate default tree 15 may deliver a multicast data packet for a particular group to some of PE routers 12 that do not have subscriber devices for that multicast group.

In the case where multicast tree 15 comprises an aggregate data tree, multicast tree 15 only carries traffic of specific multicast groups from multicast source 24 to the MVPN sites that include subscriber devices of the multicast traffic. Multicast tree 15 may be setup as an aggregate data tree by a router in SP network 10 that is coupled to multicast source 24, i.e., PE router 12A. PE router 12A may setup multicast tree 15 as an aggregate data tree by using customer join messages to discover egress PE routers 12B and 12C, i.e., the leaves of multicast tree 15. Reliable transport of customer control information allows PE router 12A to learn the multicast group membership information of PE routers 12B and 12C. This in turn allows the aggregate data tree to be mapped to specific multicast groups of MVPN A and MVPN B. As an aggregate data tree, the leaves of multicast tree 15 are the PE routers within SP network 10 that include subscriber devices of the one or more specific multicast groups mapped to multicast tree 15.

In this way, PE router 12A is able to create a separate multicast tree 15 as an aggregate data tree for specific, high-bandwidth multicast groups. More than one multicast group may be mapped onto the aggregate data tree. In addition, the multicast groups mapped to the aggregate data tree may also belong to different MVPNs.

As an aggregate data tree, multicast tree 15 transmits the traffic for these multicast groups only to those PE routers 12 with subscriber devices of the specific multicast groups. This avoids flooding other PE routers in the MVPN that have not requested the specific multicast traffic. When router 12A receives multicast traffic of one of the specific multicast groups mapped to multicast tree 15, PE router 12A may switch from an aggregate default tree to an aggregate data tree, e.g., multicast tree 15, to transmit the multicast traffic.

In addition, multicast tree 15 can be either a "source" tree or a "shared" tree. As used herein, a source tree is used to carry traffic only for the multicast VRFs that exist locally on the root of the tree. For example, in the case where PE router 12B is the root of multicast tree 15, as a source tree, multicast tree 15 may only carry traffic for MVPN A to which PE router 12B belongs. In contrast, a shared tree can carry traffic belonging to VRFs that exist on other PEs as well. For example, in the case where PE router 12B is the root of multicast tree 15, as a shared tree, multicast tree 15 may carry traffic for MVPN A to which PE router 12B belongs and for MVPN B to which PE router 12B does not belong.

Figure 2:
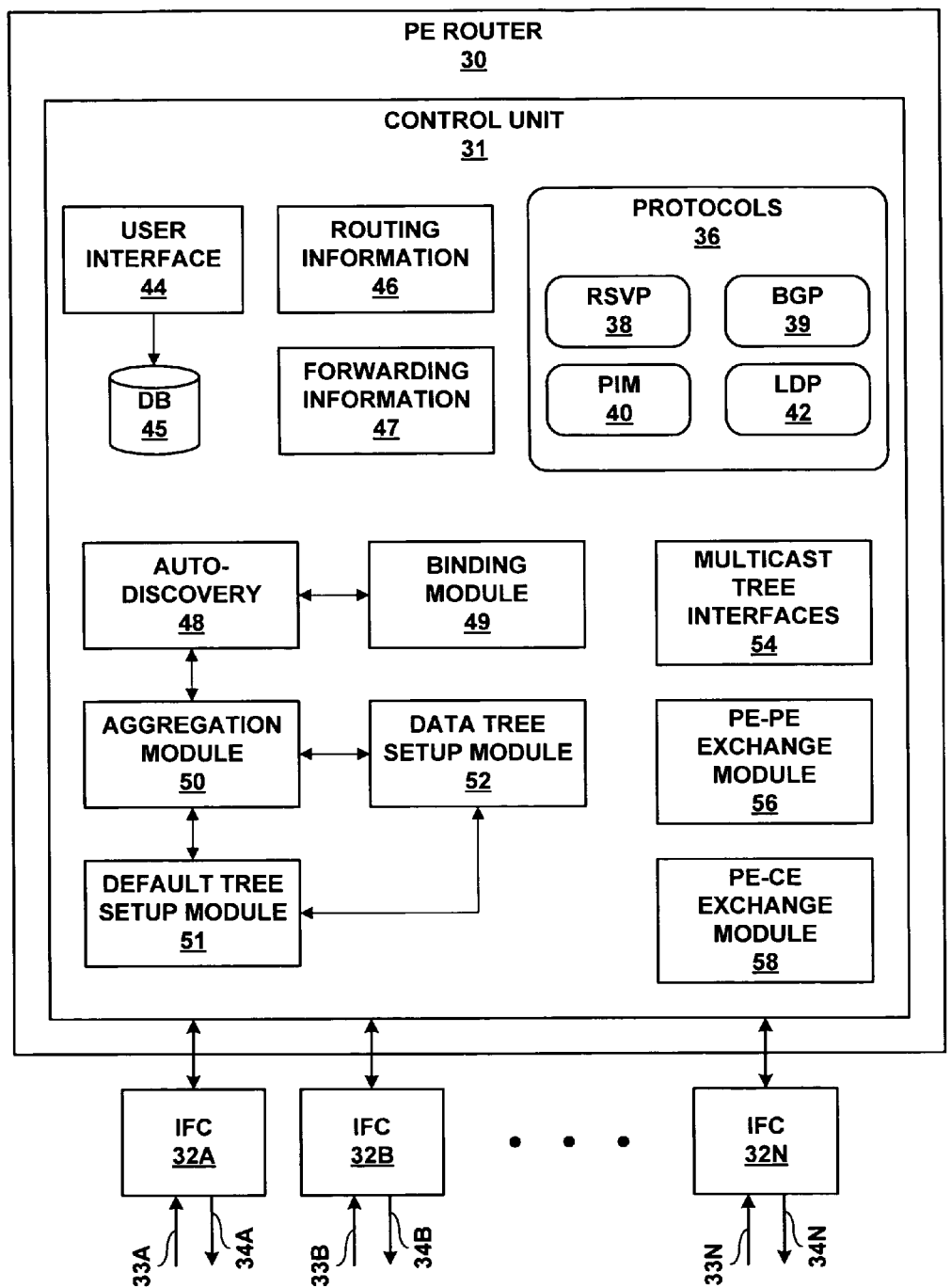
FIG. 2 is a block diagram illustrating an exemplary PE router capable of supporting one or more MVPNs.

FIG. 2 is a block diagram illustrating an exemplary PE router 30 capable of supporting one or more MVPNs in accordance with the techniques described herein. As one example, PE router 30 may comprise an ingress router or root of a multicast tree established across a public network, such as the Internet. PE router 30 may also comprise an egress router or leaf of a multicast tree established across the public network by another PE router. PE router 30 may operate substantially similar to any of PE routers 12 from FIG. 1.

In this example, PE router 30 includes interface cards 32A-32N ("IFCs 32") that receive multicast packets via inbound links 33A-33N ("inbound links 33") and send multicast packets via outbound links 34A-34N ("outbound links 34"). IFCs 32 are typically coupled to links 33, 34 via a number of interface ports. Router 30 also includes a control unit 31 that determines routes of received packets and forwards the packets accordingly via IFCs 32.

A system administrator may specify configuration information for PE router 30 via a user interface 44 included within control unit 31. The configuration information may then be stored in database (DB) 45 coupled to user interface 44. User interface 44 may include a display, a keyboard, a mouse or another type of input device.

Control unit 31 maintains routing information 46 that describes the topology of a network and, in particular, routes through the network. Routing information 46 may include, for example, route data that describes various routes within the network, and corresponding next hop data indicating appropriate neighboring devices within the network for each of the routes. Router 30 updates routing information 46 to accurately reflect the topology of the network.

Control unit 31 also maintains forwarding information 47 that associates network destinations with specific next hops and corresponding interface ports. In general, when router 30 receives a multicast packet via one of inbound links 33, control unit 31 determines a destination and associated next hop for the packet in accordance with routing information 46 and forwards the packet on one of outbound links 34 to the corresponding next hop in accordance with forwarding information 47 based on the destination of the packet.

Control unit 31 provides an operating environment for protocols 36 to execute. In the illustrated embodiment, protocols 36 include RSVP 38, BGP 39, PIM 40, and LDP 42. Control unit 31 also includes auto-discovery module 48, binding module 49, aggregation module 50, default tree setup module 51, data tree setup module 52, multicast tree interfaces 54, PE-PE exchange module 56, and PE-CE exchange module 58. In other embodiments, binding module 49 and aggregation module 50 may comprise sub-modules within auto-discovery module 48. In still other embodiments, binding module 49 and aggregation module 50 may comprise sub-modules in default tree setup module 51 and/or data tree setup module 52.

Auto-discovery module 48 advertises the MVPN memberships of PE router 30 to other PE routers in the network using BGP 39 and receives BGP advertisements from the other PE routers. Therefore, PE router 30 may have a complete view of the MVPN memberships of the other PE routers in the network. Auto-discovery module 48 then determines which PE routers in the network belong to the same MVPNs as PE router 30. PE router 30 considers all the other PE routers that advertise membership for the same MVPNs to be PIM neighbors. Auto-discovery module 48 maintains PIM neighbor adjacencies with the PE routers of each of the MVPNs as long as the BGP advertisement is not withdrawn. In this way, PE router 30 does not have to perform PIM neighbor adjacency management.

PE-CE exchange module 58 transmits multicast control messages between PE router 30 and CE routers of MVPN sites that include subscriber device of multicast traffic. For example, PE-CE exchange module 58 may receive customer join/prune messages for multicast groups from subscriber devices within the MVPN sites. PE-CE exchange module 58 may use PIM 40 to maintain PIM neighbor adjacencies with the CE routers. PIM 40 may be extended to include a refresh reduction mechanism to significantly reduce the overhead for customer control messages. In some cases, PE router 30 may communicate with a multicast source via PE-CE exchange module 58.

PE-PE exchange module 56 utilizes a reliable transport protocol to transmit PIM control messages between PE router 30 and neighboring PE routers in the network. PE-PE exchange module 56 may use either BGP 39 or PIM 40 with reliability extensions. In this way, PE-PE exchange module 56 substantially eliminates the need to periodically refresh customer control messages, such as customer join/prune messages.

Utilizing BGP 39 in auto-discovery module 48 makes the discovery and maintenance of PIM neighbors independent of the multicast data transport technology used by PE router 30. PE-PE exchange module 56 sets up PE-to-PE tunnels to exchange customer multicast control information received from subscriber devices via PE-CE exchange module 58. PE-PE exchange module 56 may encapsulate the customer control packets in a MPLS label before encapsulating the packets in the PE-to-PE tunnel. The MPLS label specifies the context of the customer control packets, e.g., a customer join message intended for a given MVPN. PE router 30 may tunnel a customer multicast control packet to another PE router in the network that is the PIM neighbor for the packet.

PE router 30 supports various multicast data packet tunneling technologies, without impacting the procedures for exchange of MVPN routing information. Default tree setup module 51 and data tree setup module 52 do not place any restrictions on the multicast technology used to setup multicast trees across the network. For example, tree setup modules 51, 52 may use RSVP 38, PIM 40, or LDP 42 to establish multicast trees. In some cases, RSVP 38 may be extended to provide TE capabilities.

For example, default tree setup module 51 may use RSVP 38 to instantiate a P2MP LSP as a multicast tree. As described above, auto-discovery module 48 discovers the MVPN memberships of other PE routers in the network. Once the leaves of the multicast default tree are discovered, default tree setup module 51 signals the LSP with conventional RSVP-TE P2MP procedures. Aggregation module 50 may then decide which of the MVPNs to aggregate into a single multicast default tree. Binding module 49 maps the chosen MVPNs to the aggregate default tree and uses BGP 39 to advertise the mapping to the egress PE routers, or leaves, of the aggregate default tree.

As another example, default tree setup module 51 may use PIM 40 to setup a multicast tree in the core of the network. In this case, the aggregate default tree is termed an aggregate multicast distribution tree (MDT). Auto-discovery module 48 discovers the MVPN memberships of other PE routers in the network. Aggregation module 50 may then decide which of the MVPNs to aggregate into a single default multicast tree. Binding module 49 maps the chosen MVPNs to the aggregate MDT and uses BGP 39 to advertise the mapping to the egress PE routers, or leaves, of the aggregate MDT. The egress PE routers can then join the aggregate MDT. The egress PE routers also join the provider group address corresponding to the aggregate MDT.

In either case, the aggregate default tree may comprise either a source tree or a shared tree. In the case of a shared tree, the aggregate default tree can carry traffic that belonging to locally located VRFs of PE router 30 and remotely located VRFs that exist on other PEs within the network. The other PEs in the network then tunnel the multicast data traffic to the root of the shared tree, e.g., PE router 30, to be transmitted on the shared tree. In this way, the shared tree substantially eliminates the need for each of the PE routers in the network to establish an individual aggregate default tree.

When PE router 30 is coupled to a multicast source, data tree setup module 52 may establish an aggregate data tree across the network. An aggregate default tree, by definition, maps to all the customer source-group (<C-S, C-G>) entries belonging to all the MVPNs associated with the aggregate default tree. An aggregate data tree maps to specific <C-S, C-G> entries associated with subscriber devices coupled to the aggregate data tree. As one example, aggregate data trees may be used to transport high bandwidth multicast traffic of one or more specific multicast groups across the network. The specific multicast groups may belong to multiple MVPNs. Aggregate data trees may substantially eliminate flooding of PE routers that do not have subscriber devices for the specific high bandwidth multicast traffic.

Prior to setting up aggregate data trees with data tree setup module 52, auto-discovery module 48 discovers PE routers in the network that have subscriber devices of specific multicast groups. Auto-discovery module 48 discovers the egress PE routers using customer join messages that PE router 30 receives. In this case, customer join suppression is disabled. Aggregation module 50 may then decide which of the multicast groups, i.e., <C-S, C-G> entries, to aggregate into a single multicast data tree. Binding module 49 maps the chosen <C-S, C-G> entries to the aggregate data tree and uses BGP 39 to advertise the mapping to the egress PE router, or leaves, of the aggregate data tree. In the case where data tree setup module 52 uses PIM 40 to setup an aggregate data tree in the network, the aggregate data tree is termed an aggregate data MDT.

Aggregate data tree creation may be triggered on criteria other than bandwidth once customer join suppression is disabled. For example, there could be a "pseudo wasted bandwidth" criteria such that PE router 30 switches to an aggregate data tree when the bandwidth multiplied by the number of PE routers without subscriber devices for a specific multicast group is above a specified threshold. This criterion may reduce the amount of bandwidth wasted by sparsely subscribed low-bandwidth groups. In addition, it may substantially eliminate the use of aggregate data trees for a high bandwidth multicast stream for which all the PE routers in the network have subscriber devices.

For either aggregate default trees or aggregate data trees, once auto-discovery module 48 has discovered the egress PE routers, i.e., leaves, of the multicast tree within the network, aggregation module 50 determines which MVPNs or <C-S, C-G> entries to aggregate into a single multicast tree. The heuristics used to decide which MVPNs or <C-S, C-G> entries to aggregate may be implementation dependent. In some cases, PE router 30 may use offline tools to aide in the aggregation decision.

The "congruency" of aggregation is defined by the amount of overlap in the egress PE routers, or leaves, of the multicast trees that are aggregated. For example, the congruency of aggregate default trees depends on the amount of overlap in memberships of MVPNs that are mapped to the aggregate default tree. If there is complete overlap, aggregation is substantially perfectly congruent. As the overlap between the MVPNs that are mapped to the aggregate default tree reduces, the congruency reduces.

If aggregation module 50 performs aggregation that it is not substantially perfectly congruent, a PE router in the network may receive multicast traffic for MVPNs to which it does not belong. As the amount of multicast traffic for these unwanted MVPNs increases, aggregation becomes less optimal with respect to delivered traffic. Hence there is a tradeoff between reducing state in the network and delivering unwanted traffic.

Aggregation module 50 may provide control over the congruency of aggregation. For example, user interface 44 may receive aggregation configuration information from a system administrator. In this way, a service provider may deploy aggregation depending on the MVPN membership and traffic profiles in the network. The service provider may also engineer the maximum amount of unwanted MVPNs for which a particular PE router may receive traffic.

Aggregate default trees and aggregate data trees require a mechanism for the egress PE routers to demultiplex the multicast traffic received over the multicast trees. Since multicast traffic belonging to multiple MVPNs can be carried over the same multicast tree, there is a need to identify the MVPN to which the multicast packet belongs. An ingress router of the multicast tree may assign an inner label that corresponds to the multicast VRF for which the packet is intended. The ingress router uses this inner label while encapsulating a customer multicast data packet. Each of the egress PE routers of the multicast tree is capable of associating this inner label with the same MVPN and using the inner label to demultiplex the multicast traffic received over the aggregate default tree or the aggregate data tree.

For purposes of illustration, PE router 30 will be described as an egress PE router of the multicast tree. Using a downstream label assignment would require all of the egress PE routers of the MVPN, including PE router 30, to agree on a common label for the MVPN. Therefore, the ingress PE router uses upstream label assignment to allocate the inner label. PE router 30 comprises a separate label space for every aggregate default tree and every aggregate data tree for which PE router 30 is a leaf node. Control unit 31 creates a forwarding entry within forwarding information 47 for the inner label allocated by the ingress PE.

When PE router 30 receives a packet over an aggregate multicast tree, an aggregate tree identifier (TI) specifies the label space in which to perform the inner label lookup. In some cases, control unit 31 may create a logical interface within multicast tree interfaces 54 that corresponds to the aggregate multicast tree. The logical interface within multicast tree interface 54 then specifies the label space in which to perform the inner label lookup.

The ingress PE router informs the egress PE routers of the aggregate multicast tree about the inner label as part of a discovery procedure. As described above, once a PE router sets up an aggregate default tree or an aggregate data tree, binding module 49 uses BGP 39 to announce the MVPNs or the <C-S, C-G> mapped to the multicast tree to the egress PE routers in the network. For an aggregate default tree, binding module 49 announces the mapping of all MVPNs mapped to the aggregate default tree. The announcement also includes the inner label allocated by the ingress PE for each MVPN and the aggregate default TI. For an aggregate data tree, binding module 49 announces the mapping of all specific <C-S, C-G> entries mapped to the aggregate data tree. The announcement also includes the inner label allocated by the ingress PE for each <C-S, C-G> entry and the aggregate data TI.

Control unit 31 may use IP/GRE (internet protocol/generic routing encapsulation) or MPLS to encapsulate multicast data packets for transmission on aggregate default trees or aggregate data trees. If the aggregate default tree or the aggregate data tree uses MPLS encapsulation, the outer MPLS label and the incoming interface specifies the label space of the inner label. In this case, penultimate-hop-popping is disabled. If the aggregate default tree or the aggregate data tree uses IP/GRE encapsulation, the root PE router source address and the provider group address of the multicast tree specifies the label space of the inner label. A lookup in the label space of the inner label identifies the multicast VRF in which to perform the customer multicast lookup.

The architecture of router 30 illustrated in FIG. 2 is shown for exemplary purposes only. The invention is not limited to this architecture. In other embodiments, router 30 may be configured in a variety of ways. In one embodiment, for example, some of the functionally of control unit 31 may be distributed within IFCs 32. In another embodiment, control unit 31 may include a routing engine that performs routing functions and maintains routing information base (RIB), e.g., routing information 46, and a forwarding engine that performs packet forwarding based on a forwarding information base (FIB), e.g., forwarding information 47, generated in accordance with the RIB.

Control unit 31 may be implemented solely in software, or hardware, or may be implemented as a combination of software, hardware, or firmware. For example, control unit 31 may include one or more processors which execute software instructions. In that case, the various software modules of control unit 31 may comprise executable instructions stored on a computer-readable medium, such as computer memory or hard disk.

Figure 3:
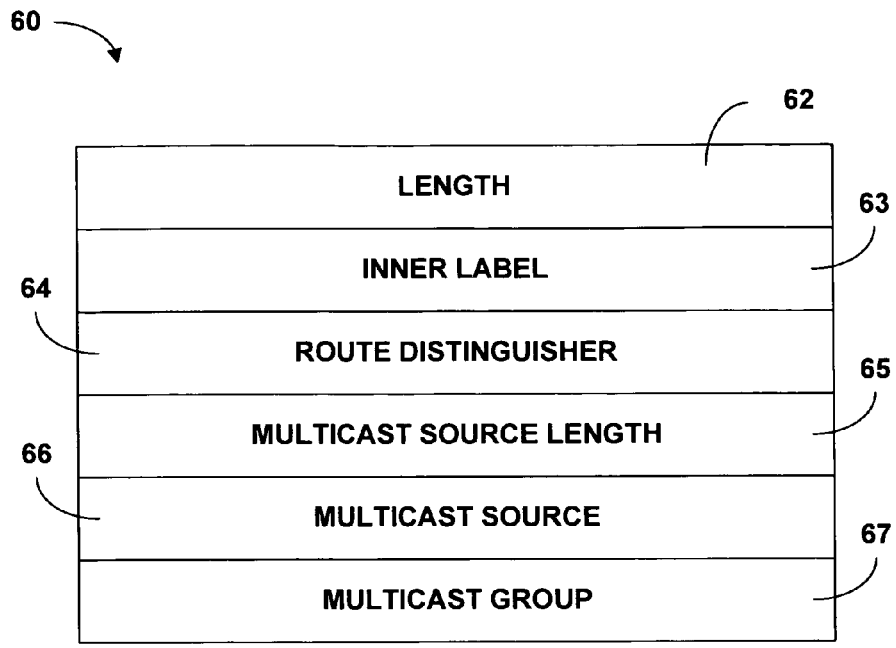
FIG. 3 illustrates an exemplary BGP encoding of network layer reachability information (NLRI).

FIG. 3 illustrates an exemplary BGP encoding 60 of network layer reachability information (NLRI) that may be utilized as an extension to BGP to support embodiments of the invention. In this example, the NLRI is associated with a MVPN subsequent address family identifier (SAFI). BGP encoding 60 comprises at least a portion of a BGP advertisement. As described above, BGP advertisements are used for MVPN membership discovery, propagation of customer control information, aggregate default tree discovery, and aggregate data tree discovery.

BGP encoding 60 encodes the NLRI into a length field 62, a MPLS label field 63, a route distinguisher (RD) field 64, a multicast source length field 65, a multicast source field 66, and a multicast group field 67. Length field 62 comprises two octets and RD field 64 comprises eight octets. The remaining fields within BGP encoding 60 comprise variable field lengths.

For MVPN membership discovery, the information elements are included in BGP encoding 60 with RD field 64 and multicast group field 67 set to zero. For a particular MVPN, the BGP advertisement includes the address of the ingress PE router as the PIM neighbor address for use by other PE routers in the network. This address may be shared by all the MVPNs to which the ingress PE router belongs or it may be different for each of the MVPNs. The BGP advertisement also includes the inner label allocated by the ingress PE router to identify the MVPN. Other PE routers in the network use the inner label to send customer join/prune messages to the ingress PE. The inner label identifies the multicast VRF for which the customer join/prune message is intended. When ingress replication is used, the inner label must be present for transmitting customer multicast traffic.

When the ingress PE router distributes this information, the BGP advertisement also includes a Route Target Extended Communities (RTEC) attribute. The RTEC attribute may be an "import route target" of each VRF in the multicast tree. BGP distribution procedures ensure that the advertised information gets associated with the right VRFs. The BGP advertisement described herein implies that a PE-CE exchange module within the ingress PE is fully functional. When the PE-CE exchange module becomes dysfunctional, the ingress PE withdraws the BGP advertisement and discontinues the PIM neighbor adjacency.

For propagation of customer multicast control information, such as customer join/prune messages, the information elements are included in BGP encoding 60. For a particular MVPN, the BGP advertisement includes the RD 64 configured for the MVPN. RD 64 uniquely identifies the <C-S, C-G> entry as the PE router addresses could overlap between different MVPNs. The BGP advertisement also includes the customer multicast source address 66 and the customer multicast group address 67. Multicast addresses 66 and 67 can be prefixes.

When the ingress PE router distributes this information, the BGP advertisement includes the RTEC attribute. BGP distribution procedures ensure that the advertised information gets associated with the right VRFs. The address of the PE router that originates the customer control information is carried in the BGP next-hop address of the MP_REACH_ATTRIBUTE.

The root of an aggregate default tree maps one or more MVPNs to the aggregate default tree. For aggregate default tree discovery, the information elements for the MVPNs that are mapped to the aggregate default tree are included in BGP encoding 60 of the NLRI. RD field 64 and multicast group field 67 are set to zero. For a particular MVPN, the BGP advertisement includes the address of the root of the aggregate default tree and the inner label allocated by the root of the aggregate default tree for the MVPN. When the ingress PE router distributes this information, the BGP advertisement also includes an aggregate default tree identifier (TI) attribute and a RTEC attribute.

To guarantee uniqueness for different NLRIs, the root of the aggregate default tree ensures that MPLS label 63 is different for MVPN membership discovery and aggregate default tree discovery. The address of the root is required in the above NLRIs to maintain uniqueness of the NLRI. Since the root address is carried in the NLRI, the BGP next-hop address in the NEXT_HOP attribute or the MP_REACH_ATTRIBUTE may be set to zero by the sender and ignored by the receiver.

The root of an aggregate data tree maps one or more <C-S, C-G> entries to the aggregate data tree. For aggregate data tree discovery, the information elements for the <C-S, C-G> entries that are mapped to the aggregate data tree are included in BGP encoding 60 of the NLRI. For a particular <C-S, C-G> entry, the BGP advertisement includes the RD 64 corresponding to the multicast enabled VRF. RD 64 uniquely identifies the <C-S, C-G> entry as the aggregate data tree root address could overlap between different MVPNs. The BGP advertisement also includes the inner label allocated by the root of the aggregate data tree for the <C-S, C-G> entry. Furthermore, the BGP advertisement includes the customer multicast source address 66 and the customer multicast group address 67. Multicast addresses 66 and 67 can be prefixes in order to allow a range of customer source and group addresses to be mapped to the aggregate data tree.

When the ingress PE router distributes this information, the BGP advertisement includes an aggregate data TI attribute and a RTEC attribute. The address of the Aggregate Data Tree root is carried in the BGP next-hop address of the MP_REACH_ATTRIBUTE.

Figure 4:
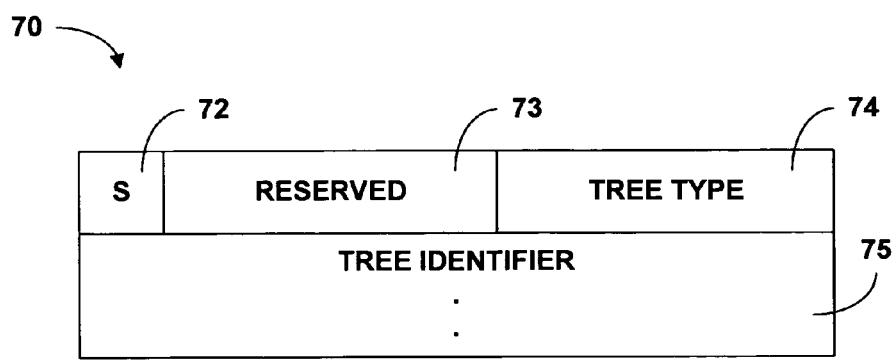
FIG. 4 illustrates an example tree identifier (TI) attribute.

FIG. 4 illustrates an example tree identifier (TI) attribute 70 for use with embodiments of the invention. TI attribute 70 enables identification of a specific aggregate default tree or aggregate data tree. As described above, aggregate default tree and aggregate data tree advertisements carry TI attribute 70. TI attribute 70 includes whether the aggregate multicast tree is a shared aggregate multicast tree and the type of tunneling protocol the root of the aggregate multicast tree used to establish the aggregate multicast tree. The TI attribute also includes the identifier of the aggregate multicast tree based on the tree type.

TI attribute 70 includes an S bit field 72, a reserved field 73, a tree type field 74, and a tree identifier list field 75. S bit 72 is set when the aggregate multicast tree comprises a shared aggregate multicast tree. In other words, TI attribute 70 announces when the aggregate multicast tree is capable of carrying traffic that belongs to VRFs that do not exist on the root of the aggregate multicast tree. Tree type field 74 identifies the multicast tunneling technology used by the root of the aggregate multicast tree to establish the aggregate multicast tree. In this way, tree type field 74 determines the semantics of tree identifier list field 75.

Tree type field 74 may identify one of PIM-SSM (source specific mode) MDT, PIM-SM (sparse mode) MDT, or RSVP-TE P2MP LSP. When the type is set to PIM-SM MDT or PIM-SSM MDT, tree identifier list field 75 contains a PIM provider source-group (<P-S, P-G>) address. Hence MP_REACH identifies a set of MVPN customer multicast trees, the TI attribute identifies a particular aggregate multicast tree, and the BGP advertisement of MP_REACH and TI creates a binding between the aggregate multicast tree and the set of MVPN customer trees.

Figure 5:
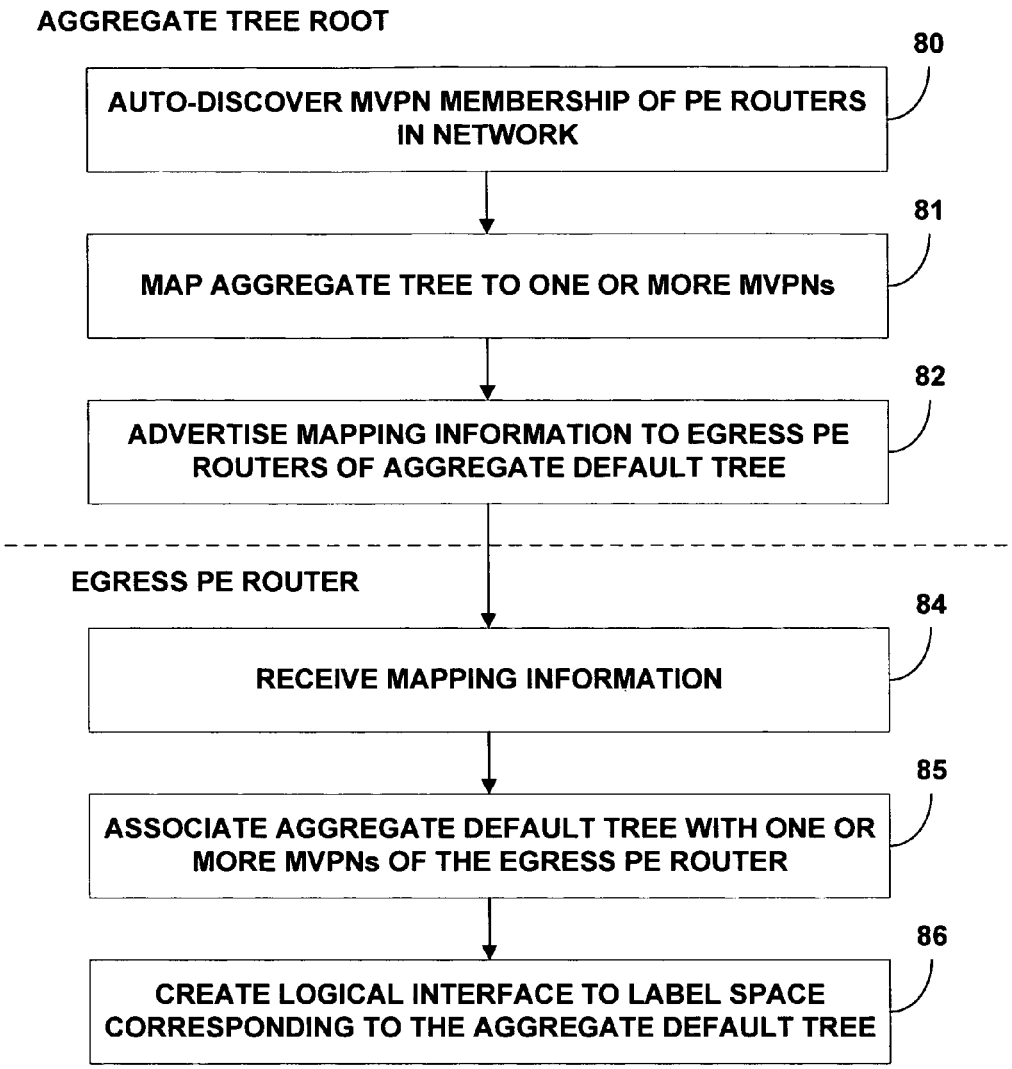
FIG. 5 is a flowchart illustrating an example procedure for setting up an aggregate default tree between a root of the aggregate default tree and an egress PE router.

FIG. 5 is a flowchart illustrating an example procedure for setting up an aggregate default tree between a root of the aggregate default tree and an egress PE router. In the case of an aggregate default tree, the aggregate tree root may comprise a PE router or a RP within the network. The aggregate default tree may be a source tree or a shared tree. The aggregate tree root and the egress PE router may operate substantially similar to PE router 30 illustrated in FIG. 2.

The aggregate tree root uses BGP to auto-discover the MVPN memberships of the PE routers in the network (80). In this way, the aggregate tree root has a complete view of the MVPN memberships of the other PE routers. From the complete MVPN listing, the aggregate tree root determines which of the MVPNs to aggregate into a single default multicast tree. The aggregate tree root then maps the aggregate default tree to these MVPNs (81). The aggregate tree root again uses BGP to advertise the mapping information to the egress PE routers of the aggregate default tree (82).

At least one of the egress PE routers of the aggregate default tree receives the advertised mapping information (84). The egress PE router examines the mapping information and associates the aggregate default tree with one or more of the MVPNs to which the egress PE router belongs (85). The egress PE router then creates a logical interface to a label space corresponding to the aggregate default tree (86). As described herein, a multicast packet transmitted on the aggregate multicast tree includes an inner label that identifies the MVPN to which the packet belongs. The logical interface directs the egress PE router to the appropriate label space in which to perform an inner label lookup. The inner label lookup in turn determines the VRF in which the egress PE router performs a customer multicast packet lookup.

Figure 6:
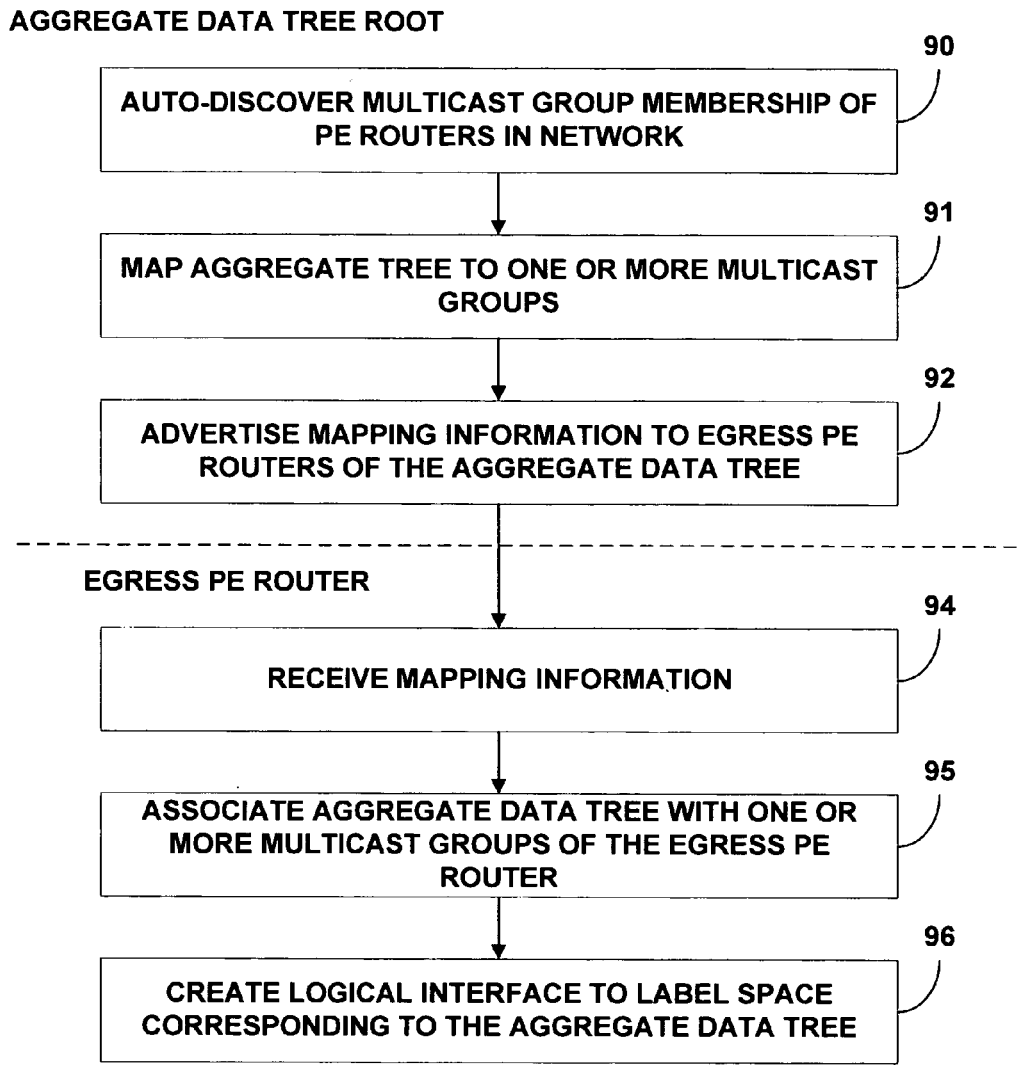
FIG. 6 is a flowchart illustrating an example procedure for setting up an aggregate data tree between a root of the aggregate data tree and an egress PE router.

FIG. 6 is a flowchart illustrating an example procedure for setting up an aggregate data tree between a root of the aggregate data tree and an egress PE router. In the case of an aggregate data tree, the aggregate tree root comprises a PE router coupled to a multicast source. The aggregate data tree may be a source tree or a shared tree. The aggregate tree root and the egress PE router may operate substantially similar to PE router 30 illustrated in FIG. 2.

The aggregate tree root uses customer join messages to auto-discover the multicast group memberships, i.e., <C-S, C-G> entries, of the PE routers in the network (90). In this way, the aggregate tree root has a complete view of the <C-S, C-G> entries of the other PE routers. From the complete multicast group listing, the aggregate tree root determines which of the <C-S, C-G> entries to aggregate into a single data multicast tree. The aggregate tree root then maps the aggregate data tree to these specific multicast groups (91). The aggregate tree root uses BGP to advertise the mapping information to the egress PE routers of the aggregate data tree (92).

At least one of the egress PE routers of the aggregate data tree receives the advertised mapping information (94). The egress PE router examines the mapping information and associates the aggregate data tree with one or more of the specific <C-S, C-G> entries to which the egress PE router belongs (95). The egress PE router then creates a logical interface to a label space corresponding to the aggregate data tree (96). As described herein, a multicast packet transmitted on the aggregate multicast tree includes an inner label that identifies the multicast group to which the packet belongs. The logical interface directs the egress PE router to the appropriate label space in which to perform an inner label lookup. The inner label lookup in turn determines the VRF in which the egress PE router performs a customer multicast packet lookup.

Figure 7A:
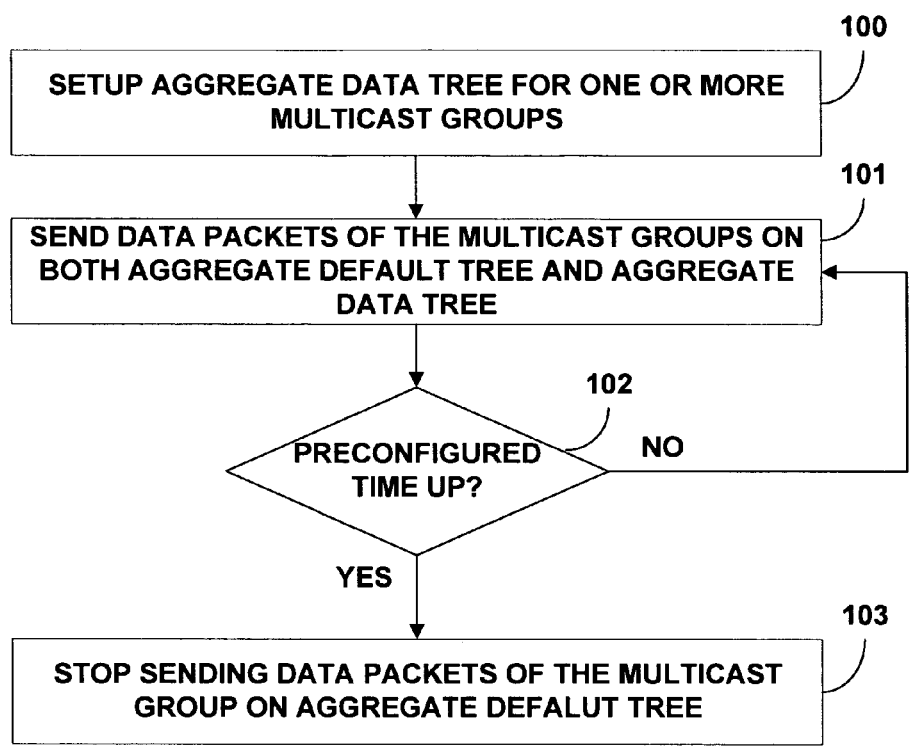
FIGS. 7A and 7B are flowcharts illustrating two exemplary processes of switching from an aggregate default tree to an aggregate data tree.
Figure 7B:
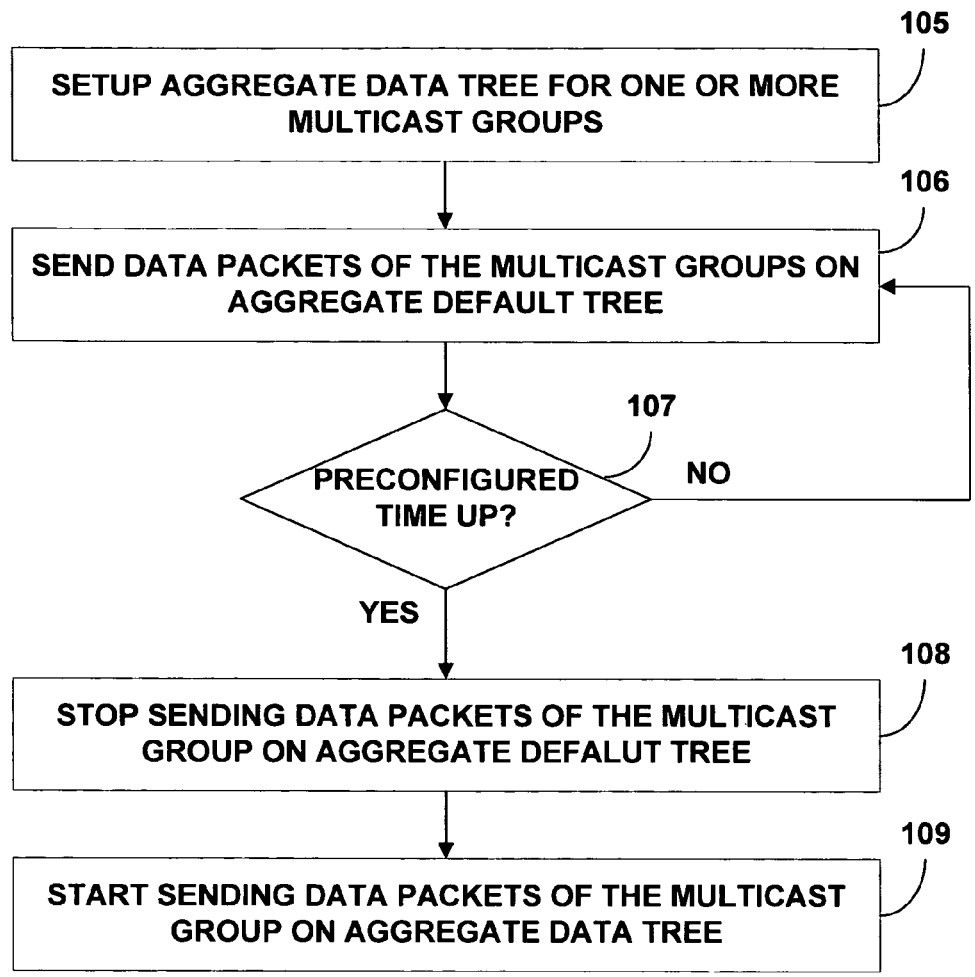

FIGS. 7A and 7B are flowcharts illustrating two exemplary processes of switching from an aggregate default tree to an aggregate data tree. Aggregate data trees provide a PE router with the ability to create separate multicast trees for specific <C-S, C-G> entries. In some cases, aggregate data trees may be setup when an amount of bandwidth on an aggregate default tree is greater than a specified threshold. In other cases, aggregate data trees may be setup when the bandwidth multiplied by the number of PE routers without subscriber devices for a specific multicast group is above a specified threshold. The ingress PE router that originates the aggregate data tree and the egress PE routers of the aggregate data tree switch to the aggregate data tree for the <C-S, C-G> entries that are mapped to the aggregate data tree.

FIG. 7A illustrates a first switching process. An ingress PE router sets up an aggregate data tree mapped to one or more multicast groups, i.e., <C-S, C-G> entries (100). The ingress PE router then announces the mapping of the <C-S, C-G> entries to the aggregate data tree to the egress PE routers of the aggregate data tree. Depending on the multicast tunneling technology, the ingress PE router may make the announcement before or after setting up the aggregate data tree. After the egress PE routers of the aggregate data tree receive the announcement, the egress PE routers setup forwarding entries, as described above, to receive multicast traffic on the aggregate data tree.

Once the ingress PE router sets up the aggregate data tree, the ingress PE router sends multicast packets of the specific <C-S, C-G> entries mapped to the aggregate data tree on both the aggregate data tree and the aggregate default tree (101). After a preconfigured amount of time (yes branch of 102), the ingress PE router stops sending the multicast packets of the specific <C-S, C-G> entries on the aggregate default tree (103).

FIG. 7B illustrates a second switching process. An ingress PE router sets up an aggregate data tree mapped to one or more multicast groups, i.e., <C-S, C-G> entries (105). The ingress PE router then announces the mapping of the <C-S, C-G> entries to the aggregate data tree to the egress PE routers of the aggregate data tree. Depending on the multicast tunneling technology, the ingress PE router may make the announcement before or after setting up the aggregate data tree. After the egress PE routers of the aggregate data tree receive the announcement, the egress PE routers setup forwarding entries, as described above, to receive multicast traffic on the aggregate data tree.

Once the ingress PE router sets up the aggregate data tree, the ingress PE router sends multicast packets of the specific <C-S, C-G> entries mapped to the aggregate data tree on the aggregate default tree (106). After a preconfigured amount of time (yes branch of 107), the ingress PE router stops sending the multicast packets of the specific <C-S, C-G> entries on the aggregate default tree (108). The ingress PE router then starts sending the multicast packets of the specific <C-S, C-G> entries mapped to the aggregate data tree on the aggregate data tree (109)

Figure 8:
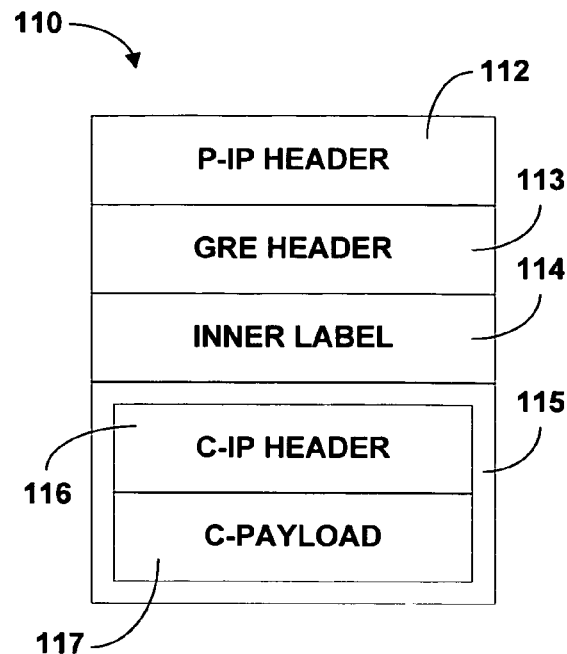
FIG. 8 illustrates an example IP encapsulated packet for transmission on a PIM-based multicast tree.

FIG. 8 illustrates an example IP encapsulated packet 110 for transmission on a PIM-based multicast tree. Techniques described above enable separate transport of customer control information using non-PIM protocols and establishment of aggregate multicast trees using PIM. In this way, the invention substantially eliminates the scalability issues introduced by conventional PIM techniques when a network includes a large number of MVPNs each with a large number of subscriber sites. The example encapsulation of FIG. 8 this may be used for any of the types of multicast trees described herein, including aggregate default multicast trees, aggregate data multicast trees, source multicast trees or shared multicast trees.

In this example, IP encapsulated packet 110 includes a provider IP (P-IP) header 112, a GRE header 113, an inner label 114, and an encapsulated payload 115. In the illustrated embodiments, encapsulated payload 115 includes a customer IP (C-IP) header 116 and a customer payload (C-payload) 117. C-payload 117 may comprise a L3 multicast data packet, such as an IP packet, requested by a subscriber device within a MVPN site.

P-IP header 112 contains the aggregate MDT or aggregate data MDT provider group address as the destination address and the root address of the MDT as the source address. The egress PE router of the MDT that receives IP encapsulated packet 110 performs a lookup on P-IP header 112 and determines the forwarding entry or interface created within the egress PE router corresponding to the aggregate MDT or aggregate data MDT. The forwarding entry or interface specifies the label space in which to perform a lookup of inner label 114.

Inner label 114 is unique within the context of the root of the MDT as it is assigned by the root of the MDT without coordination with other PE routers in the network. Therefore, inner label 114 is not unique across multiple PE routers. In order to unambiguously identify a particular MVPN or multicast group, the egress PE router has to know inner label 114 and the context within which inner label 114 is unique. The context is provided by P-IP header 112.

The egress PE router strips P-IP header 112 and GRE header 113. The egress PE router than performs the lookup of inner label 114 to determine the VRF in which the egress PE router needs to perform the customer multicast data packet lookup. The egress PE router strips inner label 114 and sends the L3 multicast packet to the VRF for multicast data forwarding.

Figure 9:
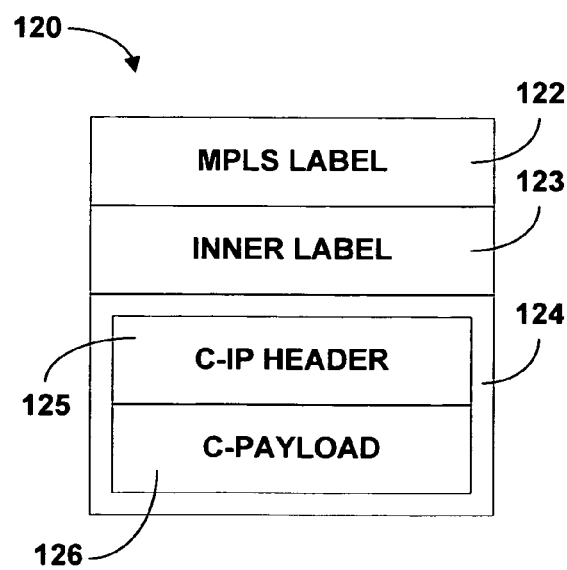
FIG. 9 illustrates an example MPLS encapsulated packet for transmission on a RSVP- or LDP-based multicast tree.

FIG. 9 illustrates an example MPLS encapsulated packet 120 for transmission on a RSVP- or LDP-based multicast tree. The example encapsulation of FIG. 9 this may be used for any of the types of multicast trees described herein, including aggregate default multicast trees, aggregate data multicast trees, source multicast trees or shared multicast trees.

In this example, MPLS encapsulated packet 120 includes an MPLS label 122, an inner label 123, and an encapsulated payload 124. In the illustrated embodiments, encapsulated payload 124 includes a customer IP (C-IP) header 125 and a customer payload (C-payload) 126. C-payload 126 may comprise a L3 multicast data packet, such as an IP packet, requested by a subscriber device within a MVPN site.

The egress PE router of an aggregate default tree or an aggregate data tree that receives MPLS encapsulated packet 120 performs a lookup on MPLS label 122 and determines the forwarding entry or interface created within the egress PE router corresponding to the aggregate default tree or aggregate data tree. The forwarding entry or interface specifies the label space in which to perform a lookup of inner label 123.

Inner label 114 is unique within the context of the root of the aggregate tree as it is assigned by the root of the aggregate tree without coordination with other PE routers in the network. Therefore, inner label 114 is not unique across multiple PE routers. In order to unambiguously identify a particular MVPN or multicast group, the egress PE router has to know inner label 123 and the context within which inner label 123 is unique. The context is provided by MPLS label 122.

The egress PE router strips MPLS label 122 and performs the lookup of inner label 123 to determine the VRF in which the egress PE router needs to perform the customer multicast data packet lookup. The egress PE router then strips inner label 123 and sends the multicast packet to the VRF for multicast data forwarding.

Figure 10:
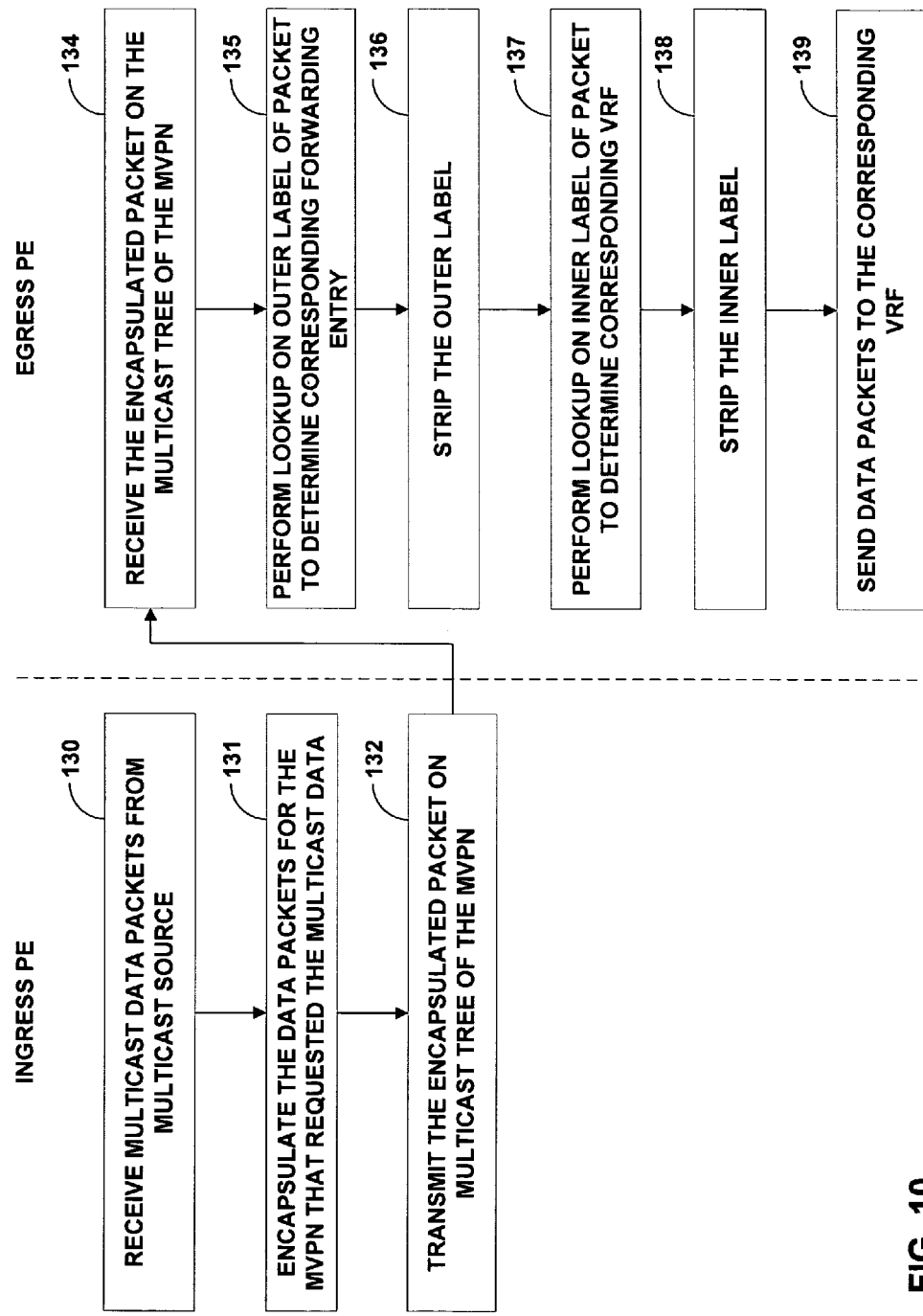
FIG. 10 is a flowchart illustrating an example process of forwarding multicast data packets on an aggregate multicast tree across a public network.

FIG. 10 is a flowchart illustrating an example process of forwarding multicast data packets on an aggregate multicast tree across a public network. The process will be described herein in reference to SP network 10 of FIG. 1. For purposes of illustration, multicast tree 15 comprises an aggregate default tree. PE router 12A establishes multicast tree 15 as a RSVP-TE P2MP LSP across SP network 10 between ingress PE router 12A and egress PE routers 12B and 12C. PE router 12A maps MVPN A and MVPN B to multicast tree 15. Multicast tree 15 may be a source tree or a shared tree.

PE router 12A receives L3 multicast data packets, such as IP packets, for at least one of MVPN A and MVPN B from multicast source 24 (130). PE router 12A encapsulates the multicast data packets for the one of MVPN A and MVPN B that includes subscriber devices of the multicast traffic (131). PE router 12A then transmits the encapsulated packet on multicast tree 15, which is mapped to the MVPN (132).

Egress PE router 12C, for example, receives the encapsulated packet on multicast tree 15 (134). Egress PE router 12C performs a lookup on the outer label of the encapsulated packet to determine the forwarding entry within egress PE router 12C that corresponds to multicast tree 15 (135). Egress PE router 12C then strips the outer label (136).

Egress PE router 12C performs a lookup on the inner label of the encapsulated packet to determine the VRF that corresponds to the MVPN (137). Egress PE router 12C then strips the inner label (138) and sends the multicast data packets to the corresponding VRF for forwarding to subscriber devices of the multicast traffic within the MVPN site.

Figure 11:
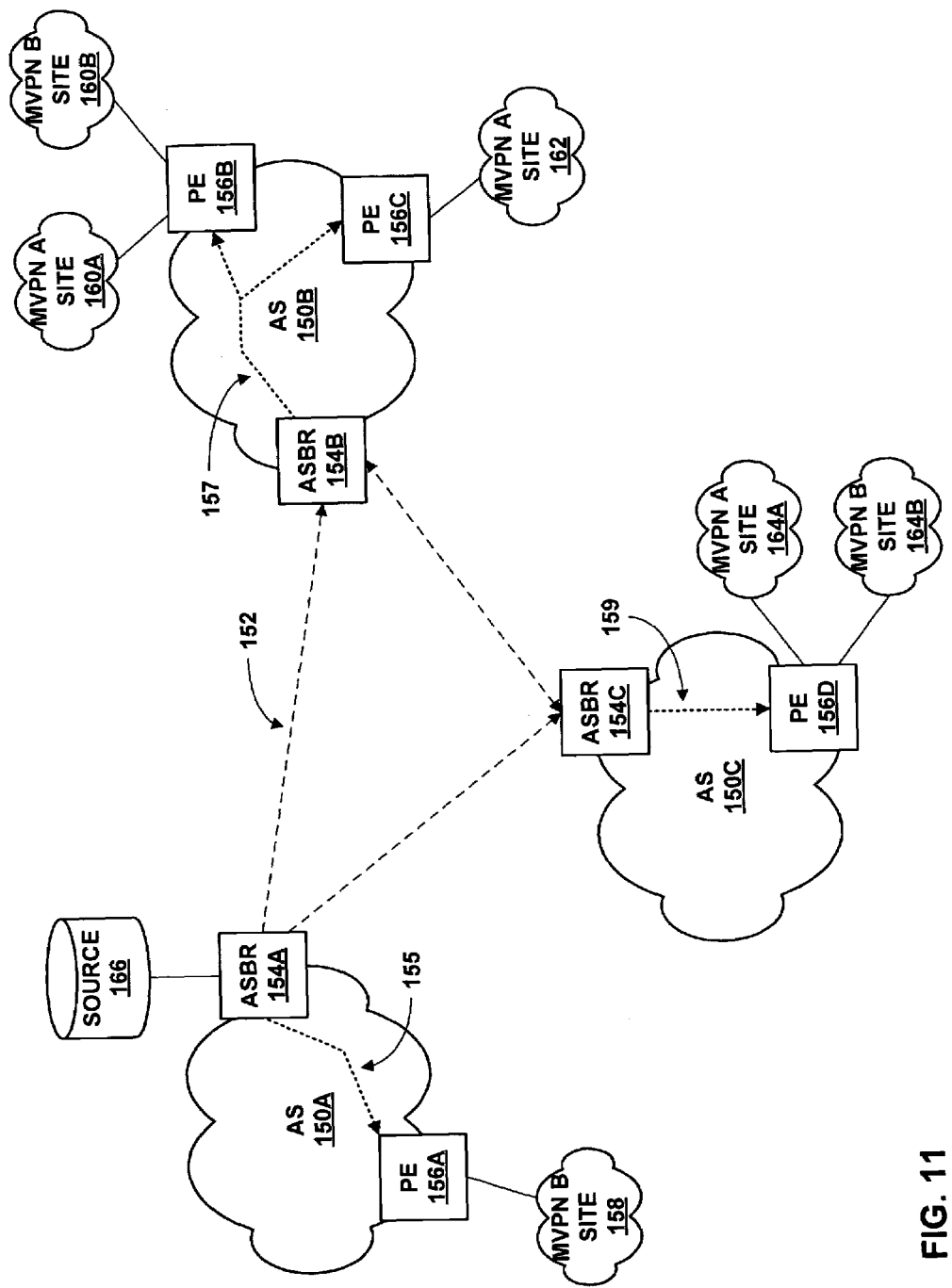
FIG. 11 is a block diagram illustrating exemplary autonomous systems (ASs) in which autonomous system border routers (ASBRs) support at least one inter-AS MVPN.

FIG. 11 is a block diagram illustrating exemplary autonomous systems (ASs) 150A-150C ("ASs 150) in which autonomous system border routers (ASBRs) 154A-154C ("ASBRs 154") support at least one inter-AS MVPN. In the illustrated embodiment, ASBRs 154 support the inter-AS MVPN A and the inter-AS MVPN B without requiring a single multicast tree to span all of ASs 150. Principles of the invention described herein allow each of ASs 150 to support an independent intra-AS multicast tree established by one or more tunneling technologies.

Each of ASs 150 may comprise a public network that includes a plurality of network devices substantially similar to SP network 10 from FIG. 1. In some cases, each of ASs 150 may belong to different service providers. Each of the MVPN sites may include a LAN or a WAN that comprises a plurality of subscriber devices, such as desktop computers, laptops, workstations, PDAs, wireless devices, network-ready appliances, file servers, print servers or other devices.

In the illustrated embodiment, AS 150A comprises ASBR 154A coupled to multicast source 166 and PE router 156A coupled to MVPN B site 158. ASBR 154A may setup a multicast tree 155 across AS 150A to PE router 156A. ASBR 154A may use PIM, RSVP, or LDP to establish multicast tree 155. Multicast tree 155 may comprise an aggregate default tree or an aggregate data tree. In addition, multicast tree 155 may comprise a source tree or a shared tree.

AS 150B comprises ASBR 154B, PE router 156B coupled to MVPN A site 160A and MVPN B site 160B, and PE router 156C coupled to MVPN A site 162. ASBR 154B may set up a multicast tree 157 across AS 150B to PE router 156B and PE router 156C. ASBR 154B may use PIM, RSVP, or LDP to establish multicast tree 157. Multicast tree 157 may comprise any form of multicast tree, including the types described herein. For example, multicast tree 157 may comprise an aggregate default tree or an aggregate data tree. Alternatively, multicast tree 157 may comprise a source tree or a shared tree.

AS 150C comprises ASBR 154C and PE router 156D coupled to MVPN A site 164A and MVPN B site 164B. ASBR 154C may set up a multicast tree 159 to PE router 156D. ASBR 154C may use PIM, RSVP, or LDP to establish multicast tree 159. Multicast tree 159 may comprise an aggregate default tree or an aggregate data tree. In addition, multicast tree 159 may comprise a source tree or a shared tree.

An inter-AS multicast tree 152 may be constructed by stitching together multicast tress 155, 157, and 159 within each of ASs 150 using MPLS label switching. For example, ASBR 154A may create inter-AS multicast tree 152 by stitching together multicast tree 155 established within AS 150A, multicast tree 157 established within AS 150B, and multicast tree 159 established within AS 150C. In this way, ASBR 154A provides multicast traffic from multicast source 166 to the MVPN sites coupled to ASs 150 via PE routers 156 without relying on a single multicast tree. In other embodiments, any of ASBRs 154 may construct inter-AS multicast tree 152.

Each of ASs 150 announces AS MVPN memberships to the other ASs 150 using BGP advertisements. ASBRs 154 use the BGP advertisements to construct a spanning tree, i.e., inter-AS multicast tree 152, on which to transmit multicast data packets for the MVPNs. MVPN membership information then propagates across ASs 150 along the spanning tree.

For AS MVPN membership discovery, the information elements are included in a BGP encoding. The BGP advertisement includes a route distinguisher for the MVPN that each ASBR in an AS uses when advertising to the other ASBRs 154. The advertisement also include an origin AS number that is encoded in an IP address, and an address of ASBR 154A as the next-hop.

For each inter-AS MVPN locally configured or discovered from a neighboring one of ASs 150, ASBR 154A instantiates multicast tree 155 constrained to AS 150A. ASBR 154A forwards multicast packets received from multicast source 166 onto intra-AS multicast tree 155 with an inner label allocated by ASBR 154A for the MVPN. ASBR 154A also forwards customer multicast data packets received from multicast source 166 for the MVPN to the other ASBRs 154 that belong to the MVPN. The multicast packet is sent over inter-AS multicast tree 152 to ASBR 150B and ASBR 150C with an inner label. In this case, the inner label for the multicast packet sent to ASBR 150B is advertised by ASBR 150B for the MVPN, and the inner label for the multicast packet sent to ASBR 150C is advertised by ASBR 150C for the MVPN.

Various embodiments of the invention have been described. These and other embodiments are within the scope of the following claims.

The invention claimed is:

1. A method comprising:
   using a label switching protocol to establish a multicast tree comprising a point-to-multipoint (P2MP) label switched path (LSP) forming a tunnel for transporting layer three (L3) multicast data packets from a source device providing an ingress to the multicast tree to a plurality of destination devices providing a plurality of different egresses from the multicast tree, wherein each of the plurality of destination devices belongs to at least one multicast virtual private network (MVPN); and
   transmitting multicast data packets for the MVPNs from the source device through the P2MP LSP to the plurality of destination devices on the multicast tree.

2. The method of claim 1, wherein transmitting multicast data packets comprises transmitting on the multicast tree the multicast data packets only for MVPNs for which multicast virtual routing and forwarding (VRFs) exist locally on the source device for the multicast tree.

3. The method of claim 1, wherein the network comprises a multi-protocol label switching (MPLS) network.

4. The method of claim 1, wherein the label switching protocol comprises one of the resource reservation protocol (RSVP) or the label distribution protocol (LDP).

5. The method of claim 1, wherein the multicast tree comprises one of a resource reservation protocol (RSVP) point to multi-point (P2MP) label switched path (LSP), a label distribution protocol (LDP) signaled P2MP LSP, or a protocol independent multicast (PIM) signaled P2MP LSP.

6. The method of claim 1, further comprising:
discovering, with the source device, the MVPNs in which each of the plurality of destination devices are members;
mapping two or more of the discovered MVPNs to the multicast tree; and
advertising mapping information from the source device to the plurality of destination devices, wherein the mapping information specifies to the destination devices which of the discovered MVPNs are mapped to the multicast tree by the source device.

7. The method of claim 6, further comprising:
allocating an inner label for each of the MVPNs mapped to the multicast tree that identifies the MVPN; and
with the source device, including the allocated inner labels within the mapping information advertised from the source device to the destination devices to allow the destination devices to demultiplex the multicast data packets received over the multicast tree for the VPLS multicast instances,
wherein transmitting the multicast data packets from the source device comprises encapsulating each of the multicast data packets at the source device with one of the inner labels based on the VPLS multicast instance with which the multicast data packet is associated and transmitting the encapsulated packet on the multicast tree.

8. The method of claim 6, further comprising determining which of the discovered MVPNs to aggregate onto the multicast tree.

9. The method of claim 1, wherein transmitting multicast data packets comprises:
receiving the multicast data packets from a multicast source;
encapsulating the multicast data packets for the MVPNs that have destination devices requesting the multicast data packets; and
transmitting the encapsulated packet for the MVPNs on the multicast tree.

10. The method of claim 1, wherein transmitting the multicast data packets comprises transmitting multicast data packets of specific multicast groups that belong to the MVPNs from the source device to the plurality of destination devices on the multicast tree.

11. A method comprising:
using a label switching protocol to establish a multicast tree having a source device and one or more destination devices within a network, wherein each of the one or more destination devices belongs to at least one multicast virtual private network (MVPN);
receiving, with each of the destination devices, mapping information from the source device of the multicast tree;
with each of the one or more destination devices, associating the multicast tree with one or more of the MVPNs to which the destination device belongs;
with each of the one or more destination devices, creating a forwarding entry in the destination device that corresponds to the multicast tree; and
transmitting multicast data packets for the MVPNs from the source device to the one or more destination devices on the multicast tree.

12. The method of claim 11, further comprising creating a logical interface to a label space within each of one or more of the destination devices that corresponds to the multicast tree.

13. A method comprising:
using a label switching protocol to establish a multicast tree having a source device and one or more destination devices within a network, wherein each of the one or more destination devices belongs to at least one multicast virtual private network (MVPN);
transmitting multicast data packets for the MVPNs from the source device to the one or more destination devices on the multicast tree;
receiving, with each of the one or more destination devices, the multicast data packets from the source device of the multicast tree; and
sending the multicast data packets to a virtual routing and forwarding (VRF) of the destination device that corresponds to the MVPN for which the multicast data packets were intended based on an inner label allocated by the source device that identifies the MVPN.

14. A network device comprising a control unit that:
uses a label switching protocol to establish a multicast tree comprising a point-to-multipoint (P2MP) label switched path (LSP) forming a tunnel for transporting layer three (L3) multicast data packets from a source device providing an ingress to the multicast tree to a plurality of destination devices providing a plurality of different egresses from the multicast tree, wherein each of the destination devices belongs to at least one multicast virtual private network (MVPN); and
transmits through the P2MP LSP multicast data packets for the MVPNs from the source device to the plurality of destination devices on the multicast tree.

15. The network device of claim 14, wherein the control unit transmits on the multicast tree the multicast data packets only for MVPNs for which multicast virtual routing and forwarding (VRFs) exist locally on the source device for the multicast tree.

16. The network device of claim 14, wherein the network comprises a multi-protocol label switching (MPLS) network.

17. The network device of claim 14, wherein the label switching protocol comprises one of the resource reservation protocol (RSVP) or the label distribution protocol (LDP).

18. The network device of claim 14, wherein the multicast tree comprises one of a resource reservation protocol (RSVP) point to multi-point (P2MP) label switched path (LSP), a label distribution protocol (LDP) signaled P2MP LSP, or a protocol independent multicast (PIM) signaled P2MP LSP.

19. The network device of claim 14, further comprising:
an auto-discovery module within the control unit that discovers MVPN memberships of the plurality of destination devices; and
a binding module within the control unit that maps at least one of the discovered MVPNs to the multicast tree and advertises mapping information to the plurality of destination devices.

20. The network device of claim 19, wherein the control unit allocates an inner label for each of the MVPNs mapped to the multicast tree that identifies the MVPN.

21. The network device of claim 19, further comprising an aggregation module that determines which of the discovered MVPNs to aggregate onto the multicast tree.

22. The network device of claim 14, wherein the control unit:
   receives the multicast data packets from a multicast source;
   encapsulates the multicast data packets for the MVPNs that have destination devices requesting the multicast data packets; and
   transmits the encapsulated packet for the MVPNs on the multicast tree.

23. The network device of claim 14, wherein the control unit transmits multicast data packets of specific multicast groups that belong to the MVPNs from the source device to the one or more destination devices on the multicast tree.

24. A network device comprising a control unit that:
   uses a label switching protocol to establish a multicast tree having a source device and one or more destination devices within a network, wherein each of the one or more destination devices belongs to at least one multicast vital private network (MVPN);
   receives mapping information from the source device of the multicast tree;
   associates the multicast tree with one or more of the MVPNs to which the destination device belongs;
   creates a forwarding entry in the destination device that corresponds to the multicast tree; and
   receives, through the P2MP LSP, multicast data packets for the MVPNs from the source device to the one or more destination devices on the multicast tree.

25. The network device of claim 24, wherein the control unit creates a logical interface to a label space within the destination device that corresponds to the multicast tree.

26. A network device comprising a control unit that:
   uses a label switching protocol to establish a multicast tree having a source device and one or more destination devices within a network, wherein each of the one or more destination devices belongs to at least one multicast virtual private network (MVPN);
   receives the multicast data packets from the source device of the multicast tree; and
   sends the multicast data packets to a virtual routing and forwarding (VRF) of the destination device that corresponds to the MVPN for which the multicast data packets were intended based on an inner label allocated by the source device that identifies the MVPN.

27. A computer-readable medium comprising instructions that cause a programmable processor to:
   use a label switching protocol to establish a multicast tree having a source device and one or more destination devices within a network, wherein each of the destination devices belongs to at least one multicast virtual private network (MVPN);
   receive multicast data packets for the MVPNs from the source device at the one or more destination devices on the multicast tree; and
   send the multicast data packets to a virtual routing and forwarding (VRF) of the destination device that corresponds to the MVPN for which the multicast data packets were intended based on an inner label allocated by the source device that identifies the MVPN.

28. The computer-readable medium of claim 27, wherein the instructions that cause the programmable processor to transmit multicast data packets cause the programmable processor to transmit on the multicast tree the multicast data packets only for MVPNs for which multicast virtual routing and forwarding (VRFs) exist locally on of the source device of the multicast tree.

29. The computer-readable medium of claim 27, further comprising instructions that cause the programmable processor to:
   discover MVPN memberships of the one or more destination devices;
   map at least one of the discovered MVPNs to the multicast tree, and
   advertise mapping information to the one or more destination devices.

30. The computer-readable medium of claim 27, further comprising instructions that cause the programmable processor to:
   receive mapping information from the source device of the multicast tree;
   associate the multicast tree with one or more of the MVPNs to which the destination device belongs; and
   create a forwarding entry in the destination device that corresponds to the multicast tree.

31. The computer-readable medium of claim 27, wherein the instructions that cause the programmable processor to transmit multicast data packets cause the programmable processor to:
   receive the multicast data packets from a multicast source;
   encapsulate the multicast data packets for the MVPNs that have destination devices requesting the multicast data packets; and
   transmit the encapsulated packet for the MVPNs on the multicast tree.

32. The computer-readable medium of claim 27, further comprising instructions that cause the programmable processor to:
   receive the multicast data packets from the source device of the multicast tree; and
   send the multicast data packets to a virtual routing and forwarding (VRF) of the destination device that corresponds to the MVPN for which the multicast data packets were intended based on an inner label allocated by the source device that identifies the MVPN.

33. The computer-readable medium of claim 27, wherein the instructions that cause the programmable processor to transmit multicast data packets cause the programmable processor to transmit multicast data packets of specific multicast groups that belong to the MVPNs from the source device to the one or more destination devices on the multicast tree.

34. A system comprising:
   a source device within a network;
   one or more destination devices within the network, wherein each of the destination devices belongs to at least one multicast virtual private networks (MVPNs); and
   a multicast tree established within the network by a label switching protocol, wherein the multicast tree transmits multicast data packets for the MVPNs from the source device to the one or more destination devices,
   wherein each of the destination devices receives the multicast data packets from the source device of the multicast tree and sends the multicast data packets to a virtual routing and forwarding (VRF) of the destination device that corresponds to the MVPN for which the multicast data packets were intended based on an inner label allocated by the source device that identifies the MVPN.

35. The system of claim 34, wherein the multicast tree transmits multicast data packets of specific multicast groups that belong to the MVPNs from the source device to the one or more destination devices on the multicast tree.

* * * * *

UNITED STATES PATENT AND TRADEMARK OFFICE
CERTIFICATE OF CORRECTION

PATENT NO.         : 7,522,599 B1
APPLICATION NO. : 11/212475
DATED              : April 21, 2009
INVENTOR(S)        : Aggarwal et al.

It is certified that error appears in the above-identified patent and that said Letters Patent is hereby corrected as shown below:

Column 21, line 18 (Claim 24), "vital" should read -- virtual --

Column 21, line 64 (Claim 28), "on of the" should read -- on the --

Signed and Sealed this

Twenty-third Day of November, 2010

David J. Kappos
*Director of the United States Patent and Trademark Office*